United States Patent
Ge et al.

(10) Patent No.: US 11,968,675 B2
(45) Date of Patent: Apr. 23, 2024

(54) UPLINK CONTROL INFORMATION SENDING AND RECEIVING METHOD AND COMMUNICATIONS APPARATUS

(71) Applicant: Huawei Technologies Co., Ltd., Shenzhen (CN)

(72) Inventors: Shibin Ge, Shanghai (CN); Xiaohan Wang, Shanghai (CN); Liuliu Ji, Shanghai (CN); Haicun Hang, Shanghai (CN); Hua Xu, Ottawa (CA); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 521 days.

(21) Appl. No.: 17/197,227

(22) Filed: Mar. 10, 2021

(65) Prior Publication Data

US 2021/0204276 A1    Jul. 1, 2021

Related U.S. Application Data

(63) Continuation of application No. PCT/CN2019/105272, filed on Sep. 11, 2019.

(30) Foreign Application Priority Data

Sep. 19, 2018  (CN) .......................... 201811092245.6

(51) Int. Cl.
*H04W 72/21*    (2023.01)
*H04L 1/1867*    (2023.01)
(Continued)

(52) U.S. Cl.
CPC ........... *H04W 72/21* (2023.01); *H04L 1/1896* (2013.01); *H04L 5/0057* (2013.01); *H04W 24/10* (2013.01); *H04W 72/23* (2023.01)

(58) Field of Classification Search
CPC ..... H04W 72/21; H04W 24/10; H04W 72/23; H04L 1/1896; H04L 5/0057;
(Continued)

(56) References Cited

U.S. PATENT DOCUMENTS

2012/0113827 A1    5/2012 Yamada et al.
2012/0320847 A1    12/2012 Nam et al.
(Continued)

FOREIGN PATENT DOCUMENTS

CN    102045861 A    5/2011
CN    102104972 A    6/2011
(Continued)

OTHER PUBLICATIONS

Bergman, J., "Further LTE Physical Layer Enhancements for MTC", 3GPP TSG RAN meeting #70, RP-151672, Dec. 7-10, 2015, 47 Pages, Sitges, Spain.
(Continued)

*Primary Examiner* — Tejis Daya
(74) *Attorney, Agent, or Firm* — Slater Matsil, LLP

(57) ABSTRACT

This application provides a UCI sending and receiving method and a communications apparatus. In the method, an association relationship between a PUCCH and a PUSCH is established, so that when resources of the PUSCH and the PUCCH overlap, a terminal device can determine UCI on which PUCCHs can be transmitted by multiplexing the resource of the PUSCH. A network device may receive the UCI on the PUSCH. Because the network device may know in advance which PUCCHs and PUSCHs are sent to the network device, the network device can demodulate and decode a signal on the received PUSCHs, to successfully obtain UCI. The network device can make a proper decision based on the UCI.

21 Claims, 5 Drawing Sheets

(51) Int. Cl.
   *H04L 5/00* (2006.01)
   *H04W 24/10* (2009.01)
   *H04W 72/23* (2023.01)

(58) Field of Classification Search
   CPC ... H04L 1/0026; H04L 1/1671; H04L 1/1854; H04L 1/1861; H04L 5/0055; H04L 1/1664; H04L 1/1812
   See application file for complete search history.

(56) References Cited

U.S. PATENT DOCUMENTS

| | | | |
|---|---|---|---|
| 2014/0036810 A1* | 2/2014 | Harrison | H04W 72/21 370/329 |
| 2014/0211732 A1* | 7/2014 | Nogami | H04L 27/2602 370/329 |
| 2015/0215093 A1* | 7/2015 | Kim | H04L 5/0057 370/329 |
| 2016/0242158 A1* | 8/2016 | Takeda | H04L 5/0055 |
| 2016/0278073 A1* | 9/2016 | Dinan | H04L 5/0057 |
| 2018/0167933 A1* | 6/2018 | Yin | H04L 5/0053 |
| 2018/0359057 A1* | 12/2018 | Yang | H04L 1/1861 |

FOREIGN PATENT DOCUMENTS

| | | | | |
|---|---|---|---|---|
| CN | 104737485 A | 6/2015 | | |
| CN | 106664520 A | 5/2017 | | |
| CN | 107017971 A | 8/2017 | | |
| CN | 107295677 A | 10/2017 | | |
| CN | 107734688 A | 2/2018 | | |
| CN | 108271251 A | 7/2018 | | |
| CN | 108293242 A | 7/2018 | | |
| EP | 2415312 A1 | 2/2012 | | |
| WO | 2010112065 A1 | 10/2010 | | |
| WO | WO-2016161656 A1 * | 10/2016 | ............ | H04W 24/10 |

OTHER PUBLICATIONS

CATT, "On UCI multiplexing on PUSCH", 3GPP TSG RAN WG1 Meeting #93, R1-1806296, May 21-25, 2018, 8 Pages, Busan, Korea.

3GPP TSG RAN WG1 Meeting #92, "Remaining issues for multiplexing UCI on PUSCH," R1-1802839, Qualcomm Incorporated, Athens, Greece, Feb. 26-Mar. 2, 2018, 13 pages.

Huawei et al., "Views on NR URLLC work in Rel-16," 3GPP TSG RAN Meeting #80, RP-180889, Jun. 11-14, 2018, 14 pages.

* cited by examiner

UPLINK CONTROL INFORMATION SENDING AND RECEIVING METHOD AND COMMUNICATIONS APPARATUS

CROSS-REFERENCE TO RELATED APPLICATIONS

This application is a continuation of International Application No. PCT/CN2019/105272, filed on Sep. 11, 2019, which claims priority to Chinese Patent Application No. 201811092245.6, filed on Sep. 19, 2018. The disclosures of the aforementioned applications are hereby incorporated by reference in their entireties.

TECHNICAL FIELD

This application relates to the field of wireless communications, and more specifically, to an uplink control information sending and receiving method and a communications apparatus.

BACKGROUND

Coordinated multipoint (CoMP) transmission is a method for resolving an inter-cell interference problem and improving a throughput of users at a cell edge. In uplink transmission, a network device may schedule a physical uplink control channel (PUCCH) and a physical uplink shared channel (PUSCH) for a terminal device in advance. Usually, the terminal device may send uplink control information (UCI) to the network device by using the PUCCH, and may further send uplink data to the network device by using the PUSCH. However, when resources of the PUCCH and the PUSCH overlap, the terminal device may transmit, by using the PUSCH, a part or all of information in the UCI originally transmitted on the PUCCH.

In some scenarios, for example, in a non-ideal backhaul scenario, due to a relatively large communication latency between network devices, a multi-site scheduling solution based on a plurality of pieces of DCI is proposed. In the multi-site scheduling solution based on the plurality of pieces of DCI, two or more network devices are supported in separately scheduling respective PDSCHs and PUSCHs for the terminal device by using DCI sent by the two or more network devices, to transmit data. Each network device may receive UCI on a PUCCH configured by the network device for the terminal device, to obtain hybrid automatic repeat request (HARQ) information and/or channel state information (CSI) of a PDSCH scheduled by the network device.

However, network devices are transparent to a terminal device. When resources of a PUCCH and a PUSCH overlap, the terminal device does not know whether the PUCCH and the PUSCH are sent to a same network device. When the PUCCH is a PUCCH sent to a network device #1, and the PUSCH is a PUSCH scheduled by a network device #2, if the terminal device transmits, on the PUSCH, UCI that is on the PUCCH, the network device #2 may not know that the UCI is transmitted on the PUSCH, and therefore cannot obtain, through parsing, the UCI and uplink data that is transmitted on the PUSCH. The network device #1 cannot receive the UCI either. Therefore, the terminal device may need to resend the uplink data that is not successfully received. In addition, the network device cannot make a proper decision for data transmission because the network device cannot learn of the UCI in a timely manner. Consequently, data transmission performance may be degraded and user experience may be poor.

SUMMARY

This application provides UCI sending and receiving methods and a communications apparatus, to reduce unnecessary retransmission, improve resource utilization, and improve transmission performance.

According to a first aspect, an uplink control information sending method is provided. The method may be performed by a terminal device, or may be performed by a chip disposed in a terminal device. This is not limited in this application.

Specifically, the method includes: determining that resources of a PUSCH and a PUCCH overlap, where the PUSCH is scheduled by a PDCCH, and the PUCCH is used to transmit UCI; and transmitting the UCI on the PUSCH when the PUCCH is associated with the PDCCH.

Optionally, when the PUCCH is not associated with a PDCCH configuration parameter, the UCI is not transmitted on the PUSCH.

To be specific, when the resources of the PUSCH scheduled by the PDCCH and the PUCCH overlap, whether the UCI may be transmitted by using the PUSCH may be determined depending on whether the PUCCH is associated with the PDCCH configuration parameter. When the PUCCH is associated with the PDCCH configuration parameter, the UCI may be transmitted by using the PUSCH. When the PUCCH is not associated with the PDCCH configuration parameter, the UCI is not transmitted by using the PUSCH.

According to a second aspect, an uplink control information receiving method is provided. The method may be performed by a network device, or may be performed by a chip disposed in a network device. This is not limited in this application.

Specifically, the method includes: determining that resources of a PUSCH and a PUCCH overlap, where the PUSCH is scheduled by a PDCCH, and the PUCCH is used to transmit UCI; and receiving the UCI on the PUSCH.

The network device may know in advance which PUCCHs are sent to the network device and which PUSCHs are scheduled by the network device. Therefore, the network device may predict UCI on which PUCCHs may be transmitted by using a PUSCH, to receive the UCI on the PUSCH.

It should be noted that, that UCI is transmitted by using a PUSCH may include: The UCI and uplink data are transmitted on the PUSCH. That UCI is not transmitted by using a PUSCH may include: Uplink data is transmitted on the PUSCH, but the UCI is not transmitted on the PUSCH. Therefore, when the UCI is transmitted by using the PUSCH, this may be referred to as resource multiplexing of the PUSCH.

The UCI that may be transmitted by using the PUSCH may specifically include at least one of HARQ information and CSI.

Based on the foregoing technical solutions, when the resources of the PUCCH and the PUSCH overlap, the terminal device may determine, depending on whether the PUCCH is associated with the PUSCH, whether the PUCCH and the PUSCH are sent to a same network device. In this way, UCI for the network device may be transmitted by using the PUSCH, and UCI for another network device is prevented from being transmitted by using the PUSCH.

Therefore, the network device may receive the UCI on the PUSCH, to determine whether a PDSCH and/or CSI need/needs to be retransmitted.

On the contrary, if the terminal device cannot determine whether the PUCCH is associated with the PUSCH, the terminal device cannot determine whether the PUCCH and the PUSCH are to be sent to a same network device (for example, denoted as a network device #1), and the terminal device may transmit, on the PUSCH, UCI that is originally to be sent to another network device (for example, denoted as a network device #2). Consequently, when receiving the PUSCH, the network device #1 cannot accurately obtain, through parsing, uplink data transmitted on the PUSCH.

In the embodiments of this application, the terminal device may transmit the UCI on the PUSCH associated with the PUCCH, and the network device may receive the UCI on a corresponding resource. Therefore, this avoids a case in which the network device cannot receive the UCI because of inconsistent resources determined by the terminal device and the network device. Because the network device can receive the UCI, the network device can make a proper decision based on the received UCI. Therefore, a resource waste caused by unnecessary retransmission is avoided, thereby improving data transmission performance and user experience.

In the embodiments of this application, that the PUCCH is associated with the PDCCH may include: The PUCCH is associated with the PDCCH configuration parameter. The PDCCH configuration parameter may be a PDCCH configuration or a downlink control parameter of the PDCCH.

With reference to the first aspect or the second aspect, in some possible implementations, the PUCCH is determined by a PUCCH configuration, and the PUCCH configuration is associated with the PDCCH configuration.

The PUCCH configuration may be used to determine the PUCCH, for example, a time-frequency resource of the PUCCH. When the PUCCH configuration is associated with the PDCCH configuration, it may be considered that the PUCCH is associated with the PDCCH configuration.

Optionally, the PUCCH configuration includes an indication of the PDCCH configuration.

That is, the associated PDCCH configuration may be explicitly indicated in the PUCCH configuration.

Optionally, the PUCCH configuration and the PDCCH configuration are configured for a same bandwidth part BWP, and an identifier of a bandwidth part BWP uplink dedicated parameter to which the PUCCH configuration belongs is the same as an identifier of a BWP downlink dedicated parameter to which the PDCCH configuration belongs.

Optionally, the PUCCH configuration and the PDCCH configuration belong to a same serving cell configuration.

That is, the PUCCH configuration and the PDCCH configuration that are associated may be implicitly indicated.

With reference to the first aspect or the second aspect, in some possible implementations, the resource of the PUCCH is determined by a CSI report configuration, and the CSI report configuration is associated with the PDCCH configuration.

The CSI report configuration may be used to determine the PUCCH. Specifically, the CSI report configuration and an active BWP may be used to determine a time-frequency resource of the PUCCH. When the CSI report configuration is associated with the PDCCH configuration, it may be considered that the PUCCH is associated with the PDCCH configuration.

Optionally, the CSI report configuration includes an indication of the PDCCH configuration.

That is, the associated PDCCH configuration may be explicitly indicated in the CSI report configuration. Each CSI report configuration may be associated with one PDCCH configuration.

Optionally, a CSI measurement configuration to which the CSI report configuration belongs includes an indication of the PDCCH configuration.

That is, the associated PDCCH configuration may be explicitly indicated in the CSI measurement configuration. Because each CSI measurement configuration may include one or more CSI report configurations, when one CSI measurement configuration is associated with one PDCCH configuration, one or more CSI report configurations in the CSI measurement configuration may be associated with the same PDCCH configuration.

Optionally, a CSI measurement configuration to which the CSI report configuration belongs and the PDCCH configuration belong to a same serving cell, and an identifier of the CSI measurement configuration is the same as an identifier of a BWP downlink dedicated parameter to which the PDCCH configuration belongs.

Optionally, a CSI measurement configuration to which the CSI report configuration belongs and the PDCCH configuration belong to a same BWP dedicated parameter in a same serving cell configuration.

Optionally, a CSI measurement configuration to which the CSI report configuration belongs and the PDCCH configuration belong to a same serving cell configuration.

That is, the CSI measurement configuration and the PDCCH configuration that are associated may be implicitly indicated, to determine the CSI report configuration and the PDCCH configuration that are associated.

With reference to the first aspect or the second aspect, in some possible implementations, the PUCCH is obtained from a plurality of PUCCH resources in a PUCCH configuration, each PUCCH resource is configured by using a set of PUCCH resource configuration parameters, and the PUCCH resource configuration parameters include an indication of an associated PDCCH configuration.

That is, one associated PDCCH configuration may be explicitly configured for each PUCCH resource.

According to a third aspect, a configuration method is provided. The method may be performed by a network device, or may be performed by a chip disposed in a network device.

Specifically, the method includes: generating first configuration information, where the first configuration information is used to indicate a PUCCH configuration and a PDCCH configuration that are associated; and sending the first configuration information.

According to a fourth aspect, a configuration method is provided. The method may be performed by a terminal device, or may be performed by a chip disposed in a terminal device.

Specifically, the method includes: receiving first configuration information, where the first configuration information is used to indicate a physical uplink control channel PUCCH configuration and a physical downlink control channel PDCCH configuration that are associated; and determining, based on the first configuration information, the PUCCH configuration and the PDCCH configuration that are associated.

Based on the foregoing technical solutions, the terminal device may determine, based on an association relationship between a PUCCH configuration and a PDCCH configuration, which PDCCH configurations and PUCCH configurations correspond to a same network device, to determine a resource of a PUCCH according to an indication of the network device, to transmit UCI. The network device may receive the UCI on the corresponding resource. This avoids a case in which the network device cannot receive the UCI because of inconsistent resources determined by the terminal device and the network device. Therefore, the first configuration information is introduced to facilitate communication between the terminal device and the network device, thereby improving transmission performance and user experience.

With reference to the third aspect or the fourth aspect, in some possible implementations, the first configuration information is the PUCCH configuration, and the PUCCH configuration includes an indication of the PDCCH configuration.

That is, the associated PDCCH configuration is explicitly indicated in the PUCCH configuration.

With reference to the third aspect or the fourth aspect, in some possible implementations, the first configuration information is the PDCCH configuration, and the PDCCH configuration includes an indication of the PUCCH configuration.

That is, the associated PUCCH configuration is explicitly indicated in the PDCCH configuration.

With reference to the third aspect or the fourth aspect, in some possible implementations, the first configuration information is a serving cell configuration, the serving cell configuration includes one or more sets of BWP uplink dedicated parameters and one or more sets of BWP downlink dedicated parameters, each set of BWP uplink dedicated parameters include one PUCCH configuration, and each set of BWP downlink dedicated parameters include one PDCCH configuration. The PUCCH configuration and the PDCCH configuration that are associated are configured for a same BWP, and an identifier of a BWP uplink dedicated parameter to which the PUCCH configuration belongs is the same as an identifier of a BWP downlink dedicated parameter to which the PDCCH configuration belongs.

With reference to the third aspect or the fourth aspect, in some possible implementations, the first configuration information is a serving cell configuration, the serving cell configuration includes one or more sets of BWP uplink dedicated parameters and one or more sets of BWP downlink dedicated parameters, each set of BWP uplink dedicated parameters include one or more PUCCH configurations, and each set of BWP downlink dedicated parameters include one or more PDCCH configurations. The PUCCH configuration and the PDCCH configuration that are associated are configured for a same BWP, an identifier of a BWP uplink dedicated parameter to which the PUCCH configuration belongs is the same as an identifier of a BWP downlink dedicated parameter to which the PDCCH configuration belongs, and an identifier of the PUCCH configuration is the same as an identifier of the PDCCH configuration.

With reference to the third aspect or the fourth aspect, in some possible implementations, the first configuration information is a serving cell configuration, and the PUCCH configuration and the PDCCH configuration that are associated belong to a same serving cell configuration.

That is, the PUCCH configuration and the PDCCH configuration that are associated are implicitly indicated.

According to a fifth aspect, a configuration method is provided. The method may be performed by a network device, or may be performed by a chip disposed in a network device.

Specifically, the method includes: generating second configuration information, where the second configuration information is used to indicate a channel state information CSI report configuration and a physical downlink control channel PDCCH configuration that are associated; and sending the second configuration information.

According to a sixth aspect, a configuration method is provided. The method may be performed by a network device, or may be performed by a chip disposed in a network device.

Specifically, the method includes: receiving second configuration information, where the second configuration information is used to indicate a channel state information (CSI) report configuration and a physical uplink shared channel PUSCH configuration that are associated; and determining, based on the second configuration information, the CSI report configuration and the PDCCH configuration that are associated.

Based on the foregoing technical solutions, the terminal device may determine, based on an association relationship between a CSI report configuration and a PDCCH configuration, which CSI report configurations and PDCCH configurations correspond to a same network device, to determine a resource of a PUCCH according to an indication of the network device, to transmit UCI. The network device may receive the UCI on the corresponding resource. This avoids a case in which the network device cannot receive the UCI because of inconsistent resources determined by the terminal device and the network device. Therefore, the second configuration information is introduced to improve transmission performance and user experience.

With reference to the fifth aspect or the sixth aspect, in some possible implementations, the second configuration information is the CSI report configuration, and the CSI report configuration includes an indication of the PDCCH configuration.

That is, the associated PDCCH configuration is explicitly indicated in the CSI report configuration.

With reference to the fifth aspect or the sixth aspect, in some possible implementations, the second configuration information is a CSI measurement configuration, the CSI measurement configuration is used to configure one or more CSI report configurations including the CSI report configuration, and the CSI measurement configuration includes an indication of the PDCCH configuration.

That is, the associated PDCCH configuration is explicitly indicated in the CSI measurement configuration. Because the CSI measurement configuration may include one or more CSI report configurations, when the CSI measurement configuration is associated with one PDCCH configuration, the one or more CSI report configurations in the CSI measurement configuration may be associated with the same PDCCH configuration.

With reference to the fifth aspect or the sixth aspect, in some possible implementations, the second configuration information is a serving cell configuration, and the serving cell configuration includes one or more CSI measurement configurations and one or more sets of BWP downlink dedicated parameters. The CSI measurement configuration includes one or more CSI report configurations, and the BWP downlink dedicated parameter includes one or more PDCCH configurations. An identifier of a CSI measurement configuration to which the CSI report configuration belongs is the same as an identifier of a BWP downlink dedicated parameter to which the associated PDCCH configuration belongs.

With reference to the fifth aspect or the sixth aspect, in some possible implementations, the second configuration information is a serving cell configuration, the serving cell configuration includes one or more sets of BWP dedicated parameters, and each set of BWP dedicated parameters include an indication of the PDCCH configuration and an indication of the CSI report configuration.

With reference to the fifth aspect or the sixth aspect, in some possible implementations, the second configuration information is a serving cell configuration, a CSI measurement configuration and the PDCCH configuration that are associated belong to a same serving cell configuration, and each CSI measurement configuration includes one or more CSI report configurations.

That is, the CSI report configuration and the PDCCH configuration that are associated are implicitly indicated.

According to a seventh aspect, a communications apparatus is provided, and includes modules or units configured to perform the method according to any one of the first aspect, the fourth aspect, or the sixth aspect, and the possible implementations of the first aspect, the fourth aspect, or the sixth aspect.

According to an eighth aspect, a communications apparatus is provided, and includes a processor. The processor is coupled to a memory, and may be configured to execute an instruction in the memory, to implement the method according to any one of the first aspect, the fourth aspect, or the sixth aspect, and the possible implementations of the first aspect, the fourth aspect, or the sixth aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip disposed in a terminal device. When the communications apparatus is a chip disposed in a terminal device, the communications interface may be an input/output interface.

Optionally, the transceiver may be a transceiver circuit. Optionally, the input/output interface may be an input/output circuit.

According to a ninth aspect, a communications apparatus is provided, and includes modules or units configured to perform the method according to any one of the second aspect, the third aspect, or the fifth aspect, and the possible implementations of the second aspect, the third aspect, or the fifth aspect.

According to a tenth aspect, a communications apparatus is provided, and includes a processor. The processor is coupled to a memory, and may be configured to execute an instruction in the memory, to implement the method according to any one of the second aspect, the third aspect, or the fifth aspect, and the possible implementations of the second aspect, the third aspect, or the fifth aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip disposed in a network device. When the communications apparatus is a chip disposed in a network device, the communications interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to receive a signal by using the input circuit, and transmit a signal by using the output circuit, so that the processor performs the method according to any one of the first aspect to the sixth aspect and the possible implementations of the first aspect to the sixth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, and the circuit is used as the input circuit and the output circuit at different moments. Specific implementations of the processor and the various circuits are not limited in this embodiment of this application.

According to a twelfth aspect, a processing apparatus is provided, and includes a processor and a memory. The processor is configured to read an instruction stored in the memory, and may receive a signal by using a receiver, and transmit a signal by using a transmitter, to perform the method according to any one of the first aspect to the sixth aspect and the possible implementations of the first aspect to the sixth aspect.

Optionally, there are one or more processors and one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner for disposing the memory and the processor are not limited in this embodiment of this application.

It should be understood that a related data exchange process, for example, sending of indication information, may be a process of outputting indication information from the processor, and receiving of capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus according to the twelfth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a thirteenth aspect, a computer program product is provided. The computer program product includes a computer program (which may also be referred to as code or an instruction). When the computer program is run, a computer is enabled to perform the method according to any one of the first aspect to the sixth aspect and the possible implementations of the first aspect to the sixth aspect.

According to a fourteenth aspect, a computer-readable medium is provided. The computer-readable medium stores a computer program (also referred to as code or an instruction); and when the computer program is run on a computer, the computer is enabled to perform the method according to any one of the first aspect to the sixth aspect and the possible implementations of the first aspect to the sixth aspect.

According to a fifteenth aspect, a communications system is provided, and includes the foregoing network device and terminal device.

DETAILED DESCRIPTION OF ILLUSTRATIVE EMBODIMENTS

Figure 1:
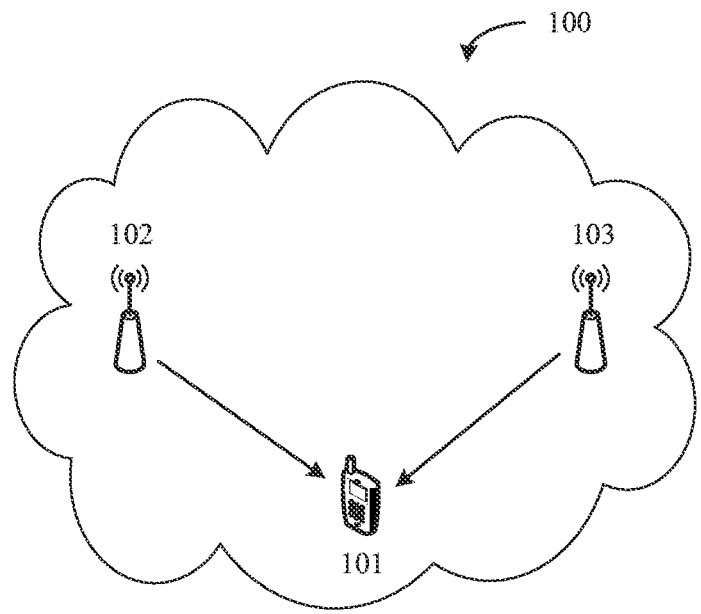
FIG. 1 is a schematic diagram of a communications system to which a method according to an embodiment of this application is applicable.

The following describes technical solutions of this application with reference to the accompanying drawings.

The technical solutions in embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

It should be understood that a network device in the communications system may be any device having a wireless transceiver function or a chip that may be disposed in the device. The device includes but is not limited to an evolved NodeB (eNB), a radio network controller (RNC), a NodeB (NB), a base station controller (BSC), a base transceiver station (BTS), a home base station (for example, a Home evolved NodeB, or a Home Node B (HNB)), a baseband unit (BBU), an access point (AP) in a wireless fidelity (WIFI) system, a wireless relay node, a wireless backhaul node, a transmission point (TP), a transmission reception point (TRP), or the like; may be a gNB or a transmission point (TRP or TP) in a 5G system, for example, an NR system, or one antenna panel or a set of antenna panels (including a plurality of antenna panels) of a base station in a 5G system; or may be a network node, for example, a baseband unit (BBU) or a distributed unit (DU), that constitutes a gNB or a transmission point.

In some deployments, the gNB may include a centralized unit (CU) and a DU. The gNB may further include a radio frequency unit (radio unit (RU)). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling, for example, RRC signaling or PHCP signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that a terminal device in the communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application.

For ease of understanding the embodiments of this application, several terms used in this application are first briefly described.

1. Uplink control information (UCI): The UCI may include one or more of channel state information (CSI), hybrid automatic repeat request (HARQ) information, and an uplink scheduling request (SR).

The CSI may include one or more of a precoding matrix indicator (PMI), a rank indication (RI), a channel quality indicator (CQI), and CSI-RS resource indication information (CSI-RS resource indication (CRI)). Based on different time domain behaviors, the CSI may be further classified into periodic CSI, semi-persistent CSI, and aperiodic CSI.

The HARQ information may also be referred to as HARQ-acknowledgement (ACK) information. The HARQ information may include an ACK or a negative acknowledgment (NACK) fed back for one or more PDSCHs. The ACK may indicate that the PDSCH is successfully received, and data on the PDSCH is successfully decoded. The NACK may indicate that the PDSCH is not successfully received, or data on the PDSCH is not successfully decoded. A network device may retransmit data based on a NACK fed back by a terminal device.

The following mainly describes the embodiments of this application for UCI that may be transmitted by using a PUSCH. The UCI may include, for example, HARQ information and/or CSI. The CSI may include periodic CSI and semi-persistent CSI. It should be understood that the method provided in the embodiments of this application is described in detail below by only using an example in which the UCI includes the HARQ information and/or the CSI. However, this shall not constitute any limitation on this application. Specific content of the UCI that can be transmitted by using the PUSCH is not limited in this application. For example, this application does not exclude a possibility that the SR may be transmitted on the PUSCH as specified in a future protocol.

2. Physical uplink control channel (PUCCH): The PUCCH may be used to transmit the UCI. Based on the content included in the UCI, manners of determining a resource of a PUCCH used to transmit the UCI (for ease of differentiation, the PUCCH used to transmit the UCI is denoted as a target PUCCH below) may also be different.

In the embodiments of this application, when resources of the target PUCCH and a PUSCH do not overlap, a terminal device may transmit UCI by using the target PUCCH; when the resources of the target PUCCH and the PUSCH overlap, the terminal device may further determine whether the target PUCCH is associated with the PUSCH, and send a part or all of information in the UCI by using the PUSCH if the target PUCCH is associated with the PUSCH.

That the target PUCCH is associated with the PUSCH may mean that the target PUCCH and the PUSCH are sent to a same network device. It should be understood that, that the target PUCCH and the PUSCH are sent to a same network device is merely a possible form of an association between the target PUCCH and the PUSCH. This shall not constitute any limitation on this application. The embodiments of this application include this form but are not limited thereto.

In a possible design, a PUCCH configuration (PUCCH config) used to determine the resource of the target PUCCH and a PDCCH configuration (PDCCH config) of a PDCCH used to schedule the PUSCH may be configured based on a same network device. In other words, a PUCCH configuration and a PDCCH configuration that are associated may correspond to a same network device.

In another possible design, a CSI report configuration (CSI-report config) used to determine the resource of the target PUCCH and a PDCCH configuration of a PDCCH used to schedule the PUSCH may be configured based on a same network device. In other words, a CSI report configuration and a PDCCH configuration that are associated may correspond to a same network device.

3. Serving cell configuration (serving cell config): The serving cell configuration may be used to configure a serving cell for a terminal device. A network device may configure a serving cell for a terminal device by using a higher layer parameter such as a serving cell configuration control element (ServingCellConfig information element).

The serving cell configuration may include one or more sets of bandwidth part (BWP) downlink parameters, an uplink configuration (uplink config), and a CSI measurement configuration (CSI-MeasConfig). The uplink configuration may include one or more BWP uplink parameters. Each set of BWP downlink parameters may be configured for one BWP. For example, a BWP ID may be indicated in the BWP downlink parameters. Each set of BWP uplink parameters may also be configured for one BWP. For example, a BWP ID may be indicated in the BWP downlink parameters. Each set of BWP downlink parameters may include BWP downlink (DL) dedicated parameters and BWP downlink (DL) common parameters, where the BWP downlink dedicated parameters may specifically include a PDCCH configuration and a PDSCH configuration. Each set of BWP uplink parameters may include BWP uplink (UL) dedicated parameters and BWP uplink (UL) common parameters, where the BWP uplink dedicated parameters may specifically include a PUCCH configuration and a PUSCH configuration. In addition, the CSI measurement configuration may include one or more CSI report configurations.

It should be noted that the common parameter may be understood as a cell-specific parameter, and the dedicated parameter may be understood as a UE-specific parameter. The BWP uplink dedicated parameter may be represented as BWP-UplinkDedicated in the NR protocol, and the BWP downlink dedicated parameter may be represented as BWP-DownlinkDedicated in the NR protocol.

4. Bandwidth part (BWP): In NR, different terminal devices in a same cell may have different transmitting or receiving capabilities. Therefore, a system may configure a corresponding bandwidth for each terminal device. The bandwidth configured for the terminal device is referred to as a BWP, and the terminal device performs transmission on the BWP of the terminal device. The BWP may be a set of contiguous frequency domain resources on a carrier. Different BWPs may occupy frequency domain resources that partially overlap, or may occupy frequency domain resources that do not overlap. The different BWPs may occupy frequency domain resources in a same bandwidth or different bandwidths. This is not limited in this application.

5. PUCCH configuration: A UE-specific PUCCH parameter may be configured based on each BWP. For example, the PUCCH configuration may include parameters such as an ID of a PUCCH resource set and an ID of a PUCCH resource. For example, the PUCCH configuration may be configured by using a higher layer parameter such as a PUCCH configuration control element (PUCCH-Config information element, PUCCH-Config IE). The PUCCH-Config IE may include, for example, a resource set addition mode list (resourceSetToAddModList) and a resource set release list (resourceSetToReleaseList). Each list may include an ID of one or more PDCCH resource sets, and each PDCCH resource set may include one or more PDCCH resources. The PUCCH-config IE may further include, for example, a resource addition mode list (resourceToAddModList) and a resource release list (resourceToReleaseList). Each list may include an ID of one or more PDCCH resources.

In the PUCCH configuration, a time domain position and a frequency domain position of each PUCCH resource may be further configured. Actually, one or more network devices may configure one PUCCH resource pool for a terminal device by using respective PUCCH configurations, and the resource pool includes a plurality of PUCCH resources. A PUCCH resource configured by each network device for the terminal device is obtained from the PUCCH resource pool. In other words, a PUCCH resource pool is a universal set of PUCCH resources configured by all network devices for a same terminal device, and a PUCCH resource configured by each network device for the terminal device may be a subset or a universal set of the PUCCH resource pool. This is not limited in this application. The terminal device may determine a corresponding PUCCH resource pool based on one or more PUCCH configurations.

When UCI includes only HARQ information, the terminal device may select a PUCCH resource set from the resource set addition mode list based on a length of the UCI, and may determine a resource of a target PUCCH in the PUCCH resource set based on a PUCCH resource indicator indicated by a network device. In other words, when the UCI is the HARQ information, the terminal device may determine the resource of the target PUCCH based on a PUCCH configuration.

In addition, the PUCCH configuration may be further used to configure a PUCCH resource for a plurality of pieces of CSI. The PUCCH-Config IE may include, for example, a multi-CSI-PUCCH resource list (multi-CSI-PUCCH-ResourceList), and the list may include, for example, two PUCCH resources.

When the UCI includes only a plurality of pieces of CSI, the terminal device may determine the resource of the target PUCCH in the multi-CSI-PUCCH-ResourceList based on a length of the UCI.

6. CSI report configuration: The CSI report configuration may be used to configure a resource for periodic CSI reporting or semi-persistent CSI reporting. For example, the CSI report configuration may be configured by using a higher layer parameter such as a CSI-ReportConfig IE. The CSI-ReportConfig IE may include, for example, a resource of a PUCCH used to transmit semi-persistent CSI and a resource of a PUCCH used to transmit periodic CSI. The CSI-ReportConfig IE includes a PUCCH-CSI resource list (pucch-CSI-ResourceList), and the PUCCH resource may be specifically indicated by using an identifier of a PUCCH resource.

When UCI includes only one piece of periodic CSI or semi-persistent CSI, a terminal device may determine a resource of a target PUCCH based on, for example, a CSI report configuration and an active BWP in physical layer signaling (for example, DCI). In other words, when the UCI includes only one piece of CSI, the terminal device may determine the resource of the target PUCCH based on at least the CSI report configuration.

In addition, the CSI report configuration may be further used to configure a report quantity, and may be specifically used to indicate information that needs to be reported in the reported CSI. For example, the information reported in the CSI may include but is not limited to a CRI, an RI, a PMI, a CQI, and the like.

7. CSI measurement configuration (CSI-measurement config): The CSI measurement configuration may be used to configure a CSI-RS resource and determine a PUCCH used for CSI reporting. A network device may configure one or more CSI report configurations for one terminal device by using a CSI measurement configuration. For example, the CSI measurement configuration may be configured by using a higher layer parameter such as a CSI-MeasConfig IE. The CSI-MeasConfig IE may include, for example, a CSI report configuration addition mode list (csi-ReportConfigToAddModList) and a CSI report configuration release list (csi-ReportConfigToReleaseList). Each list includes one or more CSI report configurations.

8. Physical uplink shared channel (PUSCH): The PUSCH may be used to transmit uplink data, and may also be used to transmit UCI. The PUSCH may be scheduled by a network device, for example, by using DCI on a PDCCH. This scheduling manner may be referred to as a dynamic grant. The PUSCH may also have a configured grant. The configured grant may be a fully RRC-configured uplink (UL) grant, where this grant manner may be referred to as a type 1 PUSCH transmission with a configured grant, or may be configured scheduling that needs to be triggered by a PDCCH, where this grant manner may be referred to as a type 2 PUSCH transmission with a configured grant. It should be understood that the PUSCH grant manners listed above are merely examples, and the PUSCH grant manners are not limited in this application.

If the network device schedules the PUSCH by using DCI, the network device may schedule the PUSCH by using, for example, a DCI format 0_0 or a DCI format 0_1, and indicate a time domain position and a frequency domain position of the PUSCH in the DCI.

If the PUSCH is a PUSCH with a configured grant, for example, the network device may configure a resource for the PUSCH with the configured grant by using a BWP uplink dedicated parameter, for example, by using a higher layer parameter such as a configuration grant configuration control element (ConfiguredGrantConfig IE).

9. PUSCH configuration: A UE-specific PUSCH parameter may be configured based on each BWP. The PUSCH configuration may be, for example, configured by using a higher layer parameter such as a PUSCH-Config IE. Parameters configured in the PUSCH-Config IE may include, for example, a data scrambling identifier, a demodulation reference signal (DMRS) type, and power control. After determining the resource of the PUSCH based on scheduling performed by a network device, a terminal device may further send the PUSCH based on a parameter in the PUSCH configuration.

10. PDCCH configuration: A PDCCH parameter, for example, a control resource set (CORESET), a search space, and another parameter that can be used to blindly detect a PDCCH, may be configured based on each BWP in each cell. The PDCCH configuration may be, for example, configured by using a higher layer parameter such as a PDCCH-config IE. The PDCCH-config IE may include, for example, a control resource set addition mode list (controlResourceSetToAddModList) and a control resource set release list (controlResourceSetToReleaseList).

Each list may include an ID of one or more control resource sets. The PDCCH-config IE may further include, for example, a search space addition mode list (searchSpaceToAddModList) and a search space release list (searchSpaceToReleaseList). Each list may include an ID of one or more search spaces.

In the embodiments of this application, for the terminal device, a PDCCH configuration of a PDCCH may be understood as a PDCCH configuration based on which the PDCCH is received. In other words, the terminal device blindly detects the PDCCH in a search space determined by the PDCCH configuration. For the network device, a PDCCH configuration of a PDCCH may be understood as a PDCCH configuration based on which the PDCCH is sent. In other words, the network device sends the PDCCH on some resources in a search space determined by the PDCCH configuration.

11. Sounding reference signal (SRS) configuration: The SRS configuration may be used to configure SRS transmission. The SRS configuration may be used to define an SRS resource list and an SRS resource set list. Each SRS resource set may include one or more SRS resources. The SRS configuration may be configured by using a higher layer parameter such as an SRS-config IE. The SRS-config IE may include, for example, an SRS resource set addition mode list (srs-ResourceSetToAddModList) and an SRS resource set release list (srs-ResourceSetToReleaseList). Each list may include an ID of one or more SRS resource sets, and each SRS resource set may include one or more SRS resources. The SRS-config IE may further include, for example, an SRS resource addition mode list (srs-ResourceToAddModList) and an SRS resource release list (srs-ResourceToReleaseList). Each list may include an ID of one or more SRS resources.

12. Spatial relation (SR): The SR may also be referred to as an uplink transmission configuration indicator (UL TCI). The spatial relation may be used to determine a transmit beam of an uplink signal. The spatial relation may be determined through beam training. A reference signal used for beam training may be, for example, an uplink reference signal, such as a sounding reference signal (SRS), or may be a downlink reference signal, such as a synchronization signal block (SSB) or a channel state information reference signal (CSI-RS).

Each spatial relation may include a serving cell index, a BWP identifier (ID), and a reference signal resource identifier. The reference signal resource identifier may be, for example, any one of the following: an SSB resource indicator (SSBRI), a non-zero power CSI-RS reference signal resource identifier (NZP-CSI-RS-ResourceId), or an SRS resource identifier (SRS-ResourceId). The SSB resource identifier may also be referred to as an SSB index.

The serving cell index, the BWP ID, and the reference signal resource identifier indicate a reference signal resource used in the beam training process, and a serving cell and a BWP that correspond to the reference signal resource. One spatial relation is used to determine one transmit beam. To be specific, one serving cell index, one BWP ID, and one reference signal resource identifier may be used to determine one transmit beam. A terminal device may maintain, in the beam training process, a correspondence between all of the serving cell index, the BWP ID, and the reference signal resource identifier and the transmit beam. A network device may maintain, in the beam training process, a correspondence between all of the serving cell index, the BWP ID, and the reference signal resource identifier and a receive beam. A pairing relationship between the transmit beam and the receive beam may be established by using the reference signal resource identifier.

In a subsequent communication process, the terminal device may determine a transmit beam based on a spatial relation indicated by the network device, and the network device may determine a receive beam based on the same spatial relation.

Specifically, the network device may configure a spatial relation list for the terminal device by using a higher layer parameter such as a PUCCH-config IE. The spatial relation list may include a plurality of spatial relations. Then, the network device may activate a spatial relation by using a spatial relation in higher layer signaling (for example, a MAC CE). The spatial relation may be used to determine a transmit beam used by the terminal device to send a PUCCH and a receive beam used by the network device to receive the PUCCH.

Alternatively, the network device may configure, for the terminal device by using a higher layer parameter such as an SRS-config IE, a spatial relation corresponding to a plurality of SRS resources. Then, the network device may indicate a selected SRS resource by using an SRI field in physical layer signaling (for example, DCI). In this way, the terminal device can determine a selected spatial relation, and the spatial relation may be used to determine a transmit beam used by the terminal device to send a PUSCH and a receive beam used by the network device to receive the PUSCH.

13. Beam: The beam in an NR protocol may be represented as a spatial domain filter (spatial filter) that is also referred to as a spatial filter or a spatial parameter. A beam used to send a signal may be referred to as a transmit beam (transmission (Tx) beam), or may be referred to as a spatial transmit filter or a spatial transmit parameter. A beam used to receive a signal may be referred to as a receive beam (reception (Rx) beam), or may be referred to as a spatial receive filter (spatial domain receive filter) or a spatial receive parameter (spatial domain receive parameter).

The transmit beam may refer to distribution of signal strength formed in different directions in space after a signal is transmitted by using an antenna, and the receive beam may refer to distribution of signal strength that is of a radio signal received from an antenna and that is in different directions in space.

14. Beam pairing relationship: The beam pairing relationship is a pairing relationship between a transmit beam and a receive beam, namely, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal in a beam sweeping manner, and the receive end may also receive a reference signal in the beam sweeping manner. Specifically, the transmit end may form different directional beams in space in a beamforming manner, and may perform polling on a plurality of different directional beams, to transmit a reference signal by using the different directional beams, so that a power of transmitting the reference signal can reach a maximum value in a direction directed by using a transmit beam. The receive end may also form different directional beams in space in the beamforming manner, and may perform polling on a plurality of different directional beams, to receive a reference signal by using the different directional beams, so that a power of receiving the reference signal by the receive end can reach a maximum value in a direction directed by using a receive beam.

By traversing each transmit beam and each receive beam, the receive end may perform channel measurement based on the received reference signal, and report a measurement result to the transmit end by using CSI. For example, the receive end may report, to the transmit end, a part of reference signal resources with relatively large reference signal received powers (RSRP), and for example, report an identifier of the reference signal resource, so that the transmit end sends and receives a signal by using a beam pairing relationship with relatively good channel quality during data or signaling transmission.

15. Cell: The cell is also referred to as a serving cell. The cell is described at a higher layer from a perspective of resource management, mobility management, or a service unit. Coverage of each network device may be divided into one or more serving cells, and the serving cell may be considered to include a frequency domain resource. In the embodiments of this application, the cell may be replaced with a serving cell or a component carrier (CC), or referred to as a carrier, or the like. In the embodiments of this application, terms "cell", "serving cell", and "CC" are used alternatively, and meanings expressed by the terms are consistent when differences between the terms are not emphasized.

16. Carrier aggregation (CA): To efficiently use a fragmented spectrum, a system supports aggregation of different component carriers. A technology in which two or more carriers are aggregated to support a larger transmission bandwidth may be referred to as the carrier aggregation.

The carrier aggregation is specific to a terminal device. Different CCs may be configured for different terminal devices. Each CC may correspond to an independent cell. In the embodiments of this application, one CC may be equivalent to one cell. For example, a primary cell (PCell) corresponds to a primary CC (or referred to as a primary component carrier), and may be a cell that establishes an initial connection for the terminal, a cell that reestablishes an RRC connection, or a primary cell specified in a handover process. A secondary cell (SCell) corresponds to a secondary CC (or referred to as a secondary component carrier), and may be a cell that is added during RRC reconfiguration and that is used to provide an additional radio resource.

For a terminal device in a connected state, if the carrier aggregation is not configured, the terminal device has one serving cell; or if the carrier aggregation is configured, the terminal device may have a plurality of serving cells that may be referred to as a serving cell set. For example, the serving cell set of the terminal device includes the primary cell and the secondary cell. In other words, the serving cell set includes at least one primary cell and at least one secondary cell. In other words, the terminal for which the carrier aggregation is configured may be connected to one PCell and a plurality of SCells. For example, in NR, a terminal device configured with carrier aggregation may be connected to one PCell and a maximum of four SCells.

It should be understood that various configurations are described in detail above, and a specific method for configuring each parameter by the network device for the terminal device is described in detail by using a higher layer parameter in the NR protocol as an example, such as a serving-CellConfig IE, a PUCCH-Config IE, and a PDCCH-Config IE. However, this shall not constitute any limitation on this application. In this application, a possibility that the network device configures the parameter for the terminal device by using other signaling or manners is not excluded.

For ease of understanding of the embodiments of this application, a communications system shown in FIG. 1 is first used as an example to describe in detail a communications system to which the method provided in the embodiments of this application is applicable. FIG. 1 is a schematic diagram of a communications system 100 to which a UCI sending and receiving method according to an embodiment of this application is applicable. As shown in the figure, the communications system 100 may include at least one terminal device, for example, a terminal device 101 shown in the figure. The communications system 100 may further include at least two network devices, for example, a network device #1 102 and a network device #2 103 shown in the figure. The network device #1 102 and the network device #2 103 may be stations in a same cell, or may be stations in different cells. This is not limited in this application. The figure is merely an example, and shows an example in which the network device #1 102 and the network device #2 103 are located in a same cell.

In the communications system 100, the network device #1 102 and the network device #2 103 may communicate with each other by using a backhaul link. The backhaul link may be a wired backhaul link (for example, an optical fiber or a copper cable), or may be a wireless backhaul link (for example, a microwave). The network device #1 102 and the network device #2 103 may collaborate with each other to provide a service for the terminal device 101. Therefore, the terminal device 101 may separately communicate with the network device #1 102 and the network device #2 103 by using radio links.

In addition, one or more of the network device #1 102 and the network device #2 103 may separately schedule a PDSCH for the terminal device 101 on one or more CCs by using a carrier aggregation technology. For example, the network device #1 102 may schedule PDSCHs for the terminal device 101 on a CC #1 and a CC #2, and the network device #2 103 may schedule PDSCHs for the terminal device 101 on the CC #1 and a CC #3. CCs on which the network device #1 102 and the network device #2 103 perform scheduling may be the same, or may be different. This is not limited in this application.

A communication latency between network devices that collaborate with each other may be classified into a communication latency in an ideal backhaul and a communication latency in a non-ideal backhaul. A communication latency between two stations in an ideal backhaul may be at a microsecond level, and can be ignored compared with that in millisecond-level scheduling in NR. A communication latency between two stations in a non-ideal backhaul may be at a millisecond level, and cannot be ignored compared with that in millisecond-level scheduling in NR.

Therefore, a multi-site scheduling solution based on a plurality of pieces of DCI is proposed. In the multi-site scheduling solution based on a plurality of pieces of DCI, a plurality of network devices are supported in separately scheduling respective PDSCHs for the terminal device by using DCI respectively sent by the plurality of network devices, to transmit data. Because the network devices are transparent to the terminal device, the terminal device may receive a plurality of pieces of DCI, but does not know whether the plurality of pieces of DCI are from one network device or a plurality of network devices. Therefore, this multi-site scheduling solution based on a plurality of pieces of DCI may also be referred to as a multi-DCI scheduling solution.

For example, the network device #1 102 in FIG. 1 may send a PDCCH to the terminal device 101, where the PDCCH may carry DCI, and the DCI may be used to schedule a PDSCH for the terminal device 101 and indicate a resource of a PUCCH. For ease of differentiation and description, the PDSCH scheduled by the network device #1 102 is denoted as, for example, a PDSCH #1, and the PUCCH determined by the network device #1 102 is denoted as, for example, a PUCCH #1. Similarly, the network device #2 103 may send a PDCCH to the terminal device 101, where the PDCCH may carry DCI, and the DCI may be used to schedule a PDSCH for the terminal device 101 and indicate a resource of a PUCCH. For ease of differentiation and description, the PDSCH scheduled by the network device #2 103 is denoted as, for example, a PDSCH #2, and the PUCCH determined by the network device #2 103 is denoted as, for example, a PUCCH #2. In other words, the terminal device 101 may receive the PDSCH #1 from the network device #1 102, and feed back a HARQ #1 for the PDSCH #1 by using the PUCCH #1; the terminal device 101 may further receive the PDSCH #2 from the network device #2 103, and feed back a HARQ #2 for the PDSCH #2 by using the PUCCH #2. Specifically, the terminal device may feed back HARQs to different network devices by using different UCI. For example, the terminal device 101 may send UCI #1 on the PUCCH #1, where the UCI #1 carries the HARQ #1; the terminal device 101 may further send UCI #2 on the PUCCH #2, where the UCI #2 carries the HARQ #2.

However, in some cases, a network device, for example, the network device #1 102, may urgently schedule a PUSCH for the terminal device based on some emergency services, for example, an ultra-reliable and low-latency communication (URLLC) service. Resources of the PUSCH scheduled by the network device #1 102 for the terminal device 101 and the PUCCH #1 and/or the PUCCH #2 may overlap. For example, a resource occupied by the PUSCH scheduled by the network device #1 102 for the terminal device overlaps with the PUCCH #1 on one or more symbols, and/or a resource occupied by the PUSCH scheduled by the network device #1 102 for the terminal device overlaps with the PUCCH #2 on one or more symbols.

During single-site scheduling, the terminal device 101 may send a part or all of information in UCI to a network device by using a PUSCH. Specifically, when resources of a PUCCH and the PUSCH overlap, the terminal device may transmit a HARQ, semi-persistent CSI, and periodic CSI in the UCI by using the PUSCH.

During multi-DCI scheduling, if the resource of the PUSCH overlaps with resources of both the PUCCH #1 and the PUCCH #2, the terminal device may still send both the UCI #1 and the UCI #2 to the network device #1 by using the PUSCH. However, because the network device #1 may not know that the terminal device sends the UCI #2 by using the PUSCH, the network device #1 may consider that UCI sent by the terminal device by using the PUSCH includes only the UCI #1, and demodulate and decode, based on a case in which the PUSCH includes only the UCI #1, a signal received on the PUSCH. Therefore, the terminal device and the network device #1 have different understandings on specific content of information transmitted on the PUSCH, and perform different processing. The network device may fail to obtain specific content of the UCI #1 through parsing. On the other hand, the network device #2 does not know that the resources of the PUCCH #2 and the PUSCH overlap, may still receive the UCI #2 on the resource of the PUCCH #2, and therefore cannot obtain the UCI #2, either. Therefore, the network device #1 may retransmit the PDSCH #1, and the network device #2 may retransmit the PDSCH #2, causing a waste of transmission resources, and leading to a data transmission latency and poor user experience.

In view of this, this application provides a configuration method, so that a terminal device can learn of an association relationship between a PUCCH resource and a PDCCH configuration in a multi-DCI scheduling scenario. This application further provides a UCI sending and receiving method, so that a terminal device can determine, in a multi-DCI scheduling scenario, which UCI can be transmitted by using a scheduled PUSCH, and a network device can receive the UCI on a corresponding resource. This can avoid a case in which the network device cannot receive the UCI because resources determined by the network device and the terminal device are inconsistent. Therefore, the network device may make a proper decision based on the UCI, to avoid unnecessary retransmission, reduce a waste of transmission resources, reduce a data transmission latency, and improve user experience.

To facilitate understanding of the embodiments of this application, the following descriptions are provided.

First, in the embodiments of this application, higher layer parameters are used widely, and the higher layer parameters may be obtained by using higher layer signaling. The higher layer signaling may be, for example, a radio resource control (RRC) message, or may be other higher layer signaling. This is not limited in this application.

Second, in the embodiments of this application, an "indication" may include a direct indication and an indirect indication, or may include an explicit indication and an implicit indication. Information indicated by a piece of information (configuration information described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is already known or pre-agreed on. For example, specific information may also be indicated by using a pre-agreed (for example, stipulated in a protocol) arrangement sequence of various pieces of information, to reduce indication overheads to some extent.

Third, in the embodiments of this application, when A and B that are associated or associated with each other are described, it may indicate that there is an association relationship between A and B. Therefore, "A and B are associated" and "there is an association relationship between A and B" may express a same meaning, in other words, may be interchangeable. For example, a PUCCH configuration and a PDCCH configuration that are associated may indicate that there is an association relationship between the PUCCH configuration and the PDCCH configuration. For another example, that a CSI report configuration is associated with a PDCCH configuration may indicate that there is an association relationship between the CSI report configuration and the PDCCH configuration. For brevity, examples are not further listed one by one herein.

Fourth, terms "first", "second", "third", and "fourth", and various sequence numbers in the following embodiments are merely used for differentiation for ease of description, and are not used to limit the scope of the embodiments of this application, for example, are used to distinguish between different indication information.

Fifth, in the embodiments shown below, "being pre-obtained" may include being indicated by a network device by using signaling or being predefined, for example, defined in a protocol. "Predefinition" may be implemented by pre-storing corresponding code or a corresponding table in a device (for example, a terminal device or a network device) or in another manner that can be used to indicate related information. A specific implementation of "predefinition" is not limited in this application.

Sixth, "storing" in the embodiments of this application may be storage in one or more memories. The one or more memories may be separately disposed, or may be integrated into an encoder or a decoder, a processor, or a communications apparatus. Alternatively, a part of the one or more memories may be separately disposed, and a part of the one or more memories are integrated into a decoder, a processor, or a communications apparatus. The memory may be a storage medium in any form. This is not limited in this application.

Seventh, a "protocol" in the embodiments of this application may be a standard protocol in the communications field, for example, may include an LTE protocol, an NR protocol, and a related protocol applied to a future communications system. This is not limited in this application.

Eighth, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally represents an "or" relationship between the associated objects. The term "at least one of the following items (pieces)" or an expression similar to the term indicates any combination of the items, and includes a single item (piece) or any combination of a plurality of items (pieces). For example, at least one of a, b, and c may indicate a, b, c, a and b, a and c, b and c, or a, b, and c, where a, b, and c may be singular or plural.

The following describes in detail the embodiments provided in this application with reference to the accompanying drawings.

It should be understood that the method provided in this application is applicable to a wireless communications system, for example, the communications system 100 shown in FIG. 1. A terminal device in the embodiments of this application may simultaneously communicate with one or more network devices. For example, the network device in the embodiments of this application may correspond to either of the network device #1 102 and the network device #2 103 in FIG. 1, and the terminal device in the embodiments of this application may correspond to the terminal device 101 in FIG. 1.

For ease of understanding of the UCI sending and receiving method provided in this application, the configuration method provided in this application is first described in detail with reference to the accompanying drawings. Because one or more network devices in the wireless communications system may provide services for a same terminal device, any network device in the wireless communications system that serves the same terminal device may configure a parameter for the terminal device according to the configuration method provided in this application. Without loss of generality, the following describes the configuration method provided in the embodiments of this application in detail by using an interaction process between one terminal device and one network device as an example.

It should be noted that when a plurality of network devices provide services for a same terminal device, the plurality of network devices may separately send configuration information to the terminal device, or a network device may send configuration information to the terminal device. This is not limited in this application.

Figure 2:
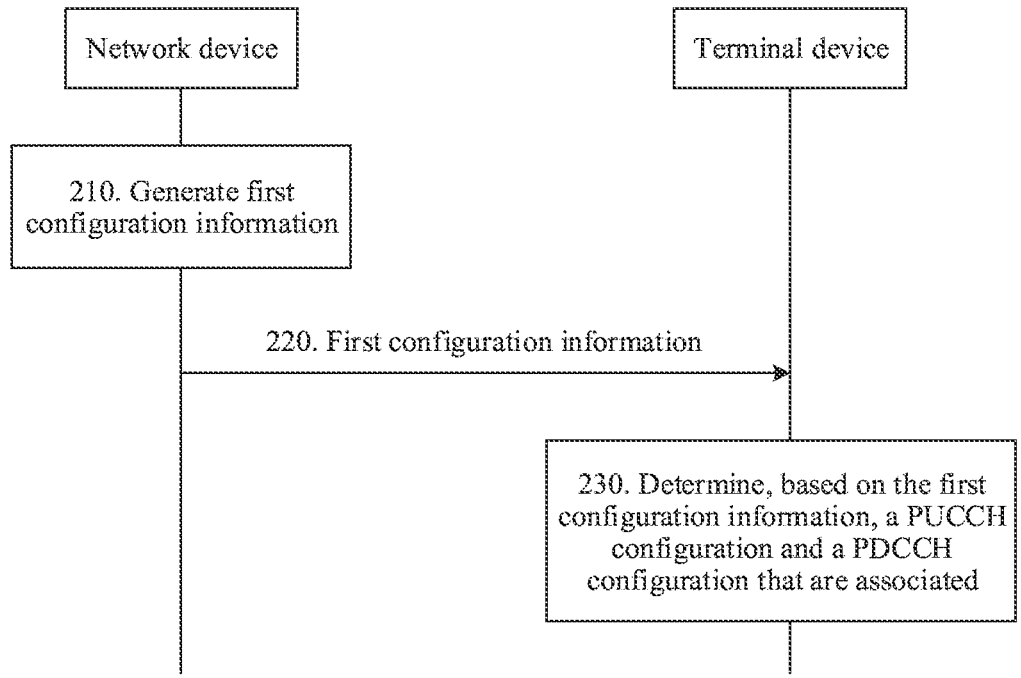
FIG. 2 is a schematic flowchart of a configuration information sending and receiving method according to an embodiment of this application.

FIG. 2 is a schematic flowchart of a configuration method 200 according to an embodiment of this application and from a device interaction perspective. As shown in the figure, the method 200 may include step 210 to step 230. The following describes the steps in the method 200 in detail.

In step 210, a network device generates first configuration information, where the first configuration information may be used to indicate a PUCCH configuration and a PDCCH configuration parameter that are associated.

In this application, for ease of differentiation and description, configuration information used to indicate the PUCCH configuration and the PDCCH configuration parameter that are associated is referred to as the first configuration information. The PDCCH configuration parameter may include higher layer parameters such as a PDCCH configuration and a downlink control parameter of a PDCCH. As described above, the PUCCH configuration may be used to determine a PUCCH resource, and the PDCCH configuration may be used to determine a search space of the PDCCH.

The PUCCH configuration and the PDCCH configuration parameter that are associated may mean that the PUCCH configuration and the PDCCH configuration parameter may be configured based on a same network device. In other words, the PUCCH configuration and the PDCCH configuration parameter that are associated may correspond to a same network device. In a multi-DCI scheduling scenario, a terminal device may receive a plurality of PUCCH configurations, and each PUCCH configuration may correspond to one network device. When a PUCCH configuration corresponds to a network device, a resource determined based on the PUCCH configuration may be used to transmit a PUCCH to the network device, and information transmitted on the resource determined based on the PUCCH configuration may be information sent to the network device. The network device may determine a resource based on the same PUCCH configuration, and receive the PUCCH on the resource. The resource that is determined based on the PUCCH configuration and that is used to transmit the PUCCH may be referred to as the PUCCH resource.

Because the PUCCH resource may be determined based on the PUCCH configuration, information transmitted on the PUCCH may be, for example, HARQ information fed back for a PDSCH scheduled by the network device by using the PDCCH, a plurality of pieces of CSI fed back to the network device, one or more pieces of CSI and HARQ information that is fed back for a PDSCH scheduled by the network device by using the PDCCH, or HARQ information (for example, including a PDSCH scheduled by the network device by using the PDCCH and a PDSCH that has no corresponding PDCCH, for example, an SPS PDSCH) and a plurality of pieces of CSI.

When the PUCCH configuration is associated with the PDCCH configuration parameter, a network device from which the PDCCH received (or blindly detected) based on the PDCCH configuration parameter comes and the network device to which the PUCCH is sent may be a same network device. When the UCI includes HARQ information for a PDSCH, the PDCCH may be the PDCCH used to schedule the PDSCH.

It should be noted that the network device configured to send the first configuration information may be a network device corresponding to the PUCCH configuration or the PDCCH configuration, or may be another network device. This is not limited in this application.

In a possible scenario, the terminal device may receive the PDCCH from the network device based on the PDCCH configuration. The network device may schedule a PDSCH for the terminal device by using the PDCCH. The terminal device may determine, based on a PUCCH resource indicator in the PDCCH and in the PUCCH configuration associated with the PDCCH configuration, a PUCCH resource used to transmit UCI, and further transmit the UCI on the PUCCH resource. The network device may receive the UCI on the PUCCH resource.

On the contrary, if the terminal device does not know an association relationship between the PUCCH configuration and the PDCCH configuration, when receiving a PDCCH, the terminal device may not know which PUCCH configuration should be used to determine a PUCCH resource used to transmit UCI. Therefore, a PUCCH resource that is determined by the terminal device and that is used to transmit UCI may be different from a PUCCH resource that is determined by the network device and that is used to receive the UCI. The network device cannot receive a feedback for a scheduled PDSCH, and consequently the network device may make an incorrect decision. For example, when the terminal device successfully receives and successfully decodes a PDSCH, the terminal device retransmits data because the terminal device does not receive UCI, wasting a transmission resource, causing a data transmission latency, and affecting user experience.

The following describes in detail a specific method for indicating, by using the first configuration information, the PUCCH configuration and the PDCCH configuration that are associated and a specific method for indicating, by using first indication information, the PUCCH configuration and the downlink control parameter of the PDCCH that are associated.

In this embodiment, the network device may configure an association relationship between a PUCCH configuration and a PDCCH configuration, to help the terminal device determine a PUCCH configuration and a PDCCH configuration that may correspond to a same network device. Specifically, the network device may indicate, to the terminal device in any one of the following listed manners, the PUCCH configuration and the PDCCH configuration that are associated:

Manner 1: An indication field is added to the PUCCH configuration, to indicate the associated PDCCH configuration.

Manner 2: An indication field is added to the PDCCH configuration, to indicate the associated PUCCH configuration.

Manner 3: The PUCCH configuration and the PDCCH configuration that are associated are configured in a serving cell configuration.

The following describes in detail the three manners listed above.

In the manner 1, the network device may add the field to the PUCCH configuration to indicate the associated PDCCH configuration. For example, the PUCCH configuration may be configured by using a higher layer parameter PUCCH-Config IE, and the network device may add a PDCCH-Config ID field to the PUCCH-Config IE, to indicate the associated PDCCH configuration. In this manner, the first configuration information may be the PUCCH configuration, for example, the PUCCH-Config IE or other signaling that may be used to implement a function the same as or similar to that of the PUCCH configuration.

It should be understood that an indication of the PDCCH configuration may be, for example, an identifier of the PDCCH configuration, for example, a PDCCH configuration 0 and a PDCCH configuration 1, or other information that may be used to indicate the PDCCH configuration. A specific form of the indication of the PDCCH configuration is not limited in this application.

In the manner 2, the network device may add the field to the PDCCH configuration to indicate the associated PUCCH configuration. Specifically, the PDCCH configuration may be configured by using a higher layer parameter PDCCH-Config IE, and the network device may add a PUCCH-Config ID field to the PDCCH-Config IE, to indicate the associated PUCCH configuration. In this manner, the first configuration information may be the PDCCH configuration, for example, the PDCCH-Config IE or other signaling that may be used to implement a function the same as or similar to that of the PDCCH configuration.

It should be understood that an indication of the PUCCH configuration may be, for example, an identifier of the PUCCH configuration, or other information that may be used to indicate the PUCCH configuration. A specific form of the indication of the PUCCH configuration is not limited in this application.

In the manner 3, the network device may indicate, by using the serving cell configuration, the PUCCH configuration and the PDCCH configuration that are associated. The first configuration information may be the serving cell configuration. For example, the serving cell configuration may be a servingCellConfig IE in the NR protocol.

In a possible design, the serving cell configuration may include one or more sets of BWP uplink parameters and one or more sets of BWP downlink parameters. Each set of BWP uplink parameters may be configured for one BWP. For example, a BWP ID may be indicated in the BWP downlink parameters. Each set of BWP uplink parameters may also be configured for one BWP. For example, a BWP ID may be indicated in the BWP downlink parameters. Each set of BWP uplink parameters may include one or more sets of BWP uplink dedicated parameters, and each set of BWP uplink dedicated parameters may include one PUCCH configuration. Each set of BWP downlink parameters may include one or more sets of BWP downlink dedicated parameters, and each set of BWP downlink dedicated parameters may include one PDCCH configuration. When a PUCCH configuration is associated with a PDCCH configuration, the PUCCH configuration and the PDCCH configuration may be configured for a same BWP, and an identifier of a BWP uplink dedicated parameter to which the PUCCH configuration belongs may be the same as an identifier of a BWP downlink dedicated parameter to which the PDCCH configuration belongs. When a PUCCH configuration and a PDCCH configuration are configured for a same BWP, a BWP ID indicated in a BWP uplink parameter to which the PUCCH configuration belongs may be the same as a BWP ID indicated in a BWP downlink parameter to which the PDCCH configuration belongs.

For example, in the serving cell configuration, BWP uplink parameters configured for a BWP may include a BWP uplink dedicated parameter 0 and a BWP uplink dedicated parameter 1, and BWP downlink parameters configured for the same BWP may include a BWP downlink dedicated parameter 0 and a BWP downlink dedicated parameter 1. In this case, a PUCCH configuration in the BWP uplink dedicated parameter 0 may be associated with a PDCCH configuration in the BWP downlink dedicated parameter 0, and a PUCCH configuration in the BWP uplink dedicated parameter 1 may be associated with a PDCCH configuration in the BWP downlink dedicated parameter 1.

For another example, in the serving cell configuration, BWP configuration parameters configured for a BWP may include one set of BWP uplink dedicated parameters, and BWP downlink parameters configured for the same BWP may include one set of BWP downlink dedicated parameters. In this case, a PUCCH configuration and a PDCCH configuration that are configured for the same BWP in the serving cell configuration may be associated with each other. In this case, because in the serving cell configuration, the uplink parameters configured for the same BWP include one set of BWP uplink dedicated parameters, and the downlink parameters configured for the same BWP include one set of BWP downlink dedicated parameters, the BWP uplink dedicated parameters and the BWP downlink dedicated parameters may not need to be distinguished by using identifiers. The PUCCH configuration in the BWP uplink dedicated parameters configured for the same BWP in the serving cell configuration is associated with the PDCCH configuration in the BWP downlink dedicated parameters configured for the same BWP in the serving cell configuration. This may be considered as a special case of that the identifier of the BWP uplink dedicated parameter to which the PUCCH configuration belongs is the same as the identifier of the BWP downlink dedicated parameter to which the PDCCH configuration belongs.

In another possible design, the serving cell configuration may include one or more sets of BWP uplink parameters and one or more sets of BWP downlink parameters. Each set of BWP uplink parameters may include one or more sets of BWP uplink dedicated parameters, and each set of BWP downlink parameters may include one or more sets of BWP downlink dedicated parameters. Each set of BWP uplink dedicated parameters may include one or more PUCCH configurations. Each set of BWP downlink dedicated parameters may include one or more PDCCH configurations. When a PUCCH configuration is associated with a PDCCH configuration, the PUCCH configuration and the PDCCH configuration may be configured for a same BWP, an identifier of a BWP uplink dedicated parameter to which the PUCCH configuration belongs may be the same as an identifier of a BWP downlink dedicated parameter to which the PDCCH configuration belongs, and an identifier of the PUCCH configuration may be the same as an identifier of the PDCCH configuration. When a PUCCH configuration and a PDCCH configuration are configured for a same BWP, a BWP ID indicated in a BWP uplink parameter to which the PUCCH configuration belongs may be the same as a BWP ID indicated in a BWP downlink parameter to which the PDCCH configuration belongs.

For example, in the serving cell configuration, BWP uplink parameters configured for a BWP may include a BWP uplink dedicated parameter 0 and a BWP uplink dedicated parameter 1, and BWP downlink parameters configured for the same BWP may include a BWP downlink dedicated parameter 0 and a BWP downlink dedicated parameter 1. The BWP uplink dedicated parameter 0 may include a PUCCH configuration 0 and a PUCCH configuration 1. The BWP uplink dedicated parameter 1 may include a PUCCH configuration 0 and a PUCCH configuration 1. The BWP downlink dedicated parameter 0 may include a PDCCH configuration 0 and a PDCCH configuration 1. The BWP downlink dedicated parameter 1 may include a PDCCH configuration 0 and a PDCCH configuration 1. In this case, the PUCCH configuration 0 in the BWP uplink dedicated parameter 0 may be associated with the PDCCH configuration 0 in the BWP downlink dedicated parameter 0, the PUCCH configuration 1 in the BWP uplink dedicated parameter 0 may be associated with the PDCCH configuration 1 in the BWP downlink dedicated parameter 0, the PUCCH configuration 0 in the BWP uplink dedicated parameter 1 may be associated with the PDCCH configuration 0 in the BWP downlink dedicated parameter 1, and the PUCCH configuration 1 in the BWP uplink dedicated parameter 1 may be associated with the PDCCH configuration 1 in the BWP downlink dedicated parameter 1.

For another example, in the serving cell configuration, BWP uplink parameters configured for a BWP may include one set of BWP uplink dedicated parameters, and BWP downlink parameters configured for the same BWP may include one set of BWP downlink dedicated parameters. The BWP uplink dedicated parameters may include a PUCCH configuration 0 and a PUCCH configuration 1, and the BWP downlink dedicated parameters may include a PDCCH configuration 0 and a PDCCH configuration 1. In this case, the PUCCH configuration 0 may be associated with the PDCCH configuration 0, and the PUCCH configuration 1 may be associated with the PDCCH configuration 1. In this case, because in the serving cell configuration, parameters configured for a same BWP include one set of BWP uplink dedicated parameters and one set of BWP downlink dedicated parameters, the BWP uplink dedicated parameters and the BWP downlink dedicated parameters may not need to be distinguished by using identifiers. The PUCCH configuration in the BWP uplink dedicated parameters configured for the same BWP in the serving cell configuration is associated with the PDCCH configuration that has a same identifier as the PUCCH configuration and that is in the BWP downlink dedicated parameters configured for the same BWP in the serving cell configuration. This may be considered as a special case of that the identifier of the BWP uplink dedicated parameter to which the PUCCH configuration belongs is the same as the identifier of the BWP downlink dedicated parameter to which the PDCCH configuration belongs.

In still another possible design, all configurations in the serving cell configuration may be associated. In this case, when a PUCCH configuration and a PDCCH configuration belong to a same serving cell configuration, the PUCCH configuration and the PDCCH configuration may be associated.

It should be understood that the foregoing lists several possible forms of the first configuration information, but this shall not constitute any limitation on this application. A specific form of the first configuration information is not limited in this application.

It should be further understood that the foregoing lists possible implementations of indicating, by using the first configuration information, the PUCCH configuration and the PDCCH configuration that are associated. However, this shall not constitute any limitation on this application. In this application, a possibility that the PUCCH configuration and the PDCCH configuration that are associated are indicated in another manner is not excluded. For example, the first configuration information may alternatively be a mapping relationship, for example, a mapping relationship table, or other information that may be used to indicate a mapping relationship. The mapping relationship may be used to indicate a PUCCH configuration and a PDCCH configuration that are corresponding to each other, and the PUCCH configuration and the PDCCH configuration that are corresponding to each other may have an association relationship.

It should be further understood that, for ease of understanding only, the foregoing provides the identifier of the BWP uplink dedicated parameter, the identifier of the BWP downlink dedicated parameter, the identifier of the PUCCH configuration, and the identifier of the PDCCH configuration as examples. However, this shall not constitute any limitation on this application. This application imposes no limitation on a quantity of sets of BWP uplink parameters, a quantity of sets of BWP downlink parameters, a quantity of sets of BWP uplink dedicated parameters, a quantity of sets of BWP downlink dedicated parameters, a quantity of PDCCH configurations, and a quantity of PUCCH configurations that are configured for a same BWP in the serving cell configuration. In addition, a manner that is of allocating an identifier and that is configured, when the serving cell configuration includes a plurality of sets of uplink or downlink parameters, for each of a plurality of sets of dedicated parameters included in each of the plurality of sets of uplink or downlink parameters is not limited in this application either. The identifier that is configured for each set of dedicated parameters may be local, or may be global.

It should be further understood that the foregoing merely shows, for ease of understanding, configuration parameters that may be included in the serving cell configuration. However, this shall not constitute any limitation on this application. The serving cell configuration may further include other configuration parameters than those listed above. This is not limited in this application.

The network device may indicate, to the terminal device in any one of the following listed manners, the PUCCH configuration and the downlink control parameter of the PDCCH that are associated:

Manner 1: An indication field is added to the PUCCH configuration, to indicate an associated DMRS port group or DMRS code division multiplexing (CDM) group (DMRS CDM group).

Manner 2: An indication field is added to the PUCCH configuration, to indicate an associated TB or codeword (CW).

The downlink control parameter may be a PDCCH-related parameter included in DCI, or a parameter related to a parameter in the DCI.

For example, the PDCCH-related parameter indicated in the DCI may be an antenna port for uplink transmission or downlink transmission. A parameter related to the antenna port may be a demodulation reference signal (DMRS) port, a DMRS group, or a DMRS CDM group. The terminal device may determine a DMRS port based on the antenna port indicated in the DCI, and further determine a DMRS port group or a DMRS CDM group to which the DMRS port belongs. For example, a relationship between an antenna port and a DMRS port in a downlink system may be: Antenna port=1000+DMRS port; a relationship between an antenna port and a DMRS port in an uplink system may be: Antenna port=DMRS port. Optionally, the terminal device may further determine, based on the DMRS port, a DMRS port group or a DMRS CDM group to which the DMRS port belongs.

It should be noted that the DMRS port group and the DMRS CDM group may be understood as being obtained by grouping DMRS ports in different manners. The antenna port, the DMRS port, the DMRS port group, and the DMRS CDM group may be distinguished by using indexes, identifiers, or other information that may be used to distinguish between different ports or different groups. This is not limited in this application.

For another example, the PDCCH-related parameter indicated in the DCI is a parameter related to a transport block (TB). The parameter related to the TB may include, for example, an MCS used to configure a modulation order and a code rate, an NDI used to indicate whether a transmission is a new transmission or a retransmission, an RV, and the like.

The following describes in detail the two manners listed above.

In the manner 1, the network device may add the field to the PUCCH configuration to indicate the associated DMRS port group or DMRS CDM group. For example, the PUCCH configuration may be configured by using a higher layer parameter PUCCH-Config IE, and the network device may add a DMRS port group ID field to the PUCCH-Config IE, to indicate the associated DMRS port group; or the network device may add a DMRS CDM group ID field to the PUCCH-Config IE, to indicate the associated DMRS CDM group. In this manner, the first configuration information may be the PUCCH configuration, for example, the PUCCH-Config IE or other signaling that may be used to implement a function the same as or similar to that of the PUCCH configuration.

When receiving a PDCCH used to schedule a PUSCH or a PDSCH, the terminal device may determine a PUCCH configuration associated with the PDCCH, based on a downlink control parameter of the PDCCH, for example, a correspondence that is between an antenna port and a DMRS port, a DMRS port group, or a DMRS CDM group and that is indicated in the DCI.

For example, when an association field in a PUCCH configuration 0 is 0, it is assumed that a DMRS port group 0 can be associated; when an association field in a PUCCH configuration 1 is 1, it is assumed that a DMRS port group 1 can be associated. When a DMRS port corresponding to an antenna port indicated by DCI in a PDCCH received by the terminal device belongs to a group port group 1, the PUCCH configuration 1 is associated with the PDCCH.

In the manner 2, the network device may add the field to the PUCCH configuration to indicate the associated TB or CW. For example, the PUCCH configuration may be configured by using a higher layer parameter PUCCH-Config IE, and the network device may add the field, to the PUCCH-Config IE, used to indicate the TB or the CW, to indicate the associated TB or CW. In this manner, the first configuration information may be the PUCCH configuration, for example, the PUCCH-Config IE or other signaling that may be used to implement a function the same as or similar to that of the PUCCH configuration.

DCI format 1_1 is used as an example. In the DCI format 1_1, there is configuration information of two TBs, for example, a TB 1 and a TB 2. Parameters corresponding to each TB may include an MCS, an NDI, and an RV. In NR, the DCI format 1_1 supports enabling of one TB. Therefore, the network device may enable one TB and disable the other TB in the DCI. In parameters corresponding to a TB, if MCS=26 and RV=1, it is considered that the TB is disabled. Therefore, when receiving a PDCCH, the terminal device may determine an enabled TB based on an MCS and an RV that are of each TB and that are indicated in the DCI, to determine a PUCCH configuration associated with the PDCCH.

For example, when an association field in a PUCCH configuration 0 is 0, it is assumed that a TB 1 can be associated; when an association field in a PUCCH configuration 1 is 1, it is assumed that a TB 2 can be associated. For a previous TB indicated by the DCI in the PDCCH received by the terminal device, when MCS=26 and RV=1, it indicates that the TB 1 is disabled and the TB 2 is enabled. In this case, the PUCCH configuration 1 is associated with the PDCCH.

Because there is a one-to-one correspondence between a TB and a CW, both an associated TB and an associated CW may be indicated in the PUCCH configuration. When one of the associated TB and the associated CW is indicated in the PUCCH configuration, the terminal device may determine the other one associated with the PUCCH configuration.

It should be understood that the foregoing lists implementations of indicating, by using the first configuration information, the PUCCH configuration and the PDCCH CSI report configuration or the CSI measurement configuration that are associated. However, this shall not constitute any limitation on this application. In this application, a possibility that the PUCCH configuration and the downlink control parameter of the PDCCH that are associated are indicated in another manner is not excluded.

In step 220, the network device sends the first configuration information. Correspondingly, in step 220, the terminal device receives the first configuration information.

Optionally, the first configuration information may be carried in higher layer signaling. The higher layer signaling may be, for example, an RRC message.

It may be understood that when serving a plurality of terminal devices, the network device may send the first configuration information to the terminal devices by using different signaling. When communicating with a plurality of network devices, the terminal device may also receive first configuration information from the plurality of network devices.

In step 230, the terminal device determines, based on the first configuration information, the PUCCH configuration and the PDCCH configuration that are associated.

When receiving first configuration information from one or more network devices, the terminal device may determine, in the manner described in step 220, the PUCCH configuration and the PDCCH configuration that are associated.

When it is defined in a protocol that the PUCCH configuration and the PDCCH configuration are associated in one of the manners listed above, the network device may generate the first configuration information in a manner defined in the protocol, and the terminal device may parse the first configuration information in a manner defined in the protocol, to determine the PUCCH configuration and the PDCCH configuration that are associated.

Based on the foregoing technical solutions, the terminal device may determine, based on an association relationship between a PUCCH configuration and a PDCCH configuration, which PDCCH configurations and PUCCH configurations correspond to a same network device, to determine a resource of a PUCCH according to an indication of the network device, to transmit UCI. The network device may receive the UCI on the corresponding resource. This avoids a case in which the network device cannot receive the UCI because of inconsistent resources determined by the terminal device and the network device. Therefore, the first configuration information is introduced to facilitate communication between the terminal device and the network device, thereby improving transmission performance and user experience.

In some cases, the terminal device needs to report CSI to the network device, for example, periodic CSI or semi-persistent CSI. During single-site scheduling, the terminal device may determine, based on a CSI report configuration, a PUCCH used to report CSI. However, during multi-DCI scheduling, the terminal device may receive a plurality of CSI report configurations. In this case, because the terminal device does not know a correspondence between a CSI report configuration and a network device, the terminal device and the network device may determine a PUCCH based on different CSI report configurations. In this case, determined PUCCH resources may be different, and the network device cannot successfully receive CSI. Therefore, this application further provides a configuration method, which may be used to configure an association relationship between a CSI report configuration and a PDCCH.

Figure 3:
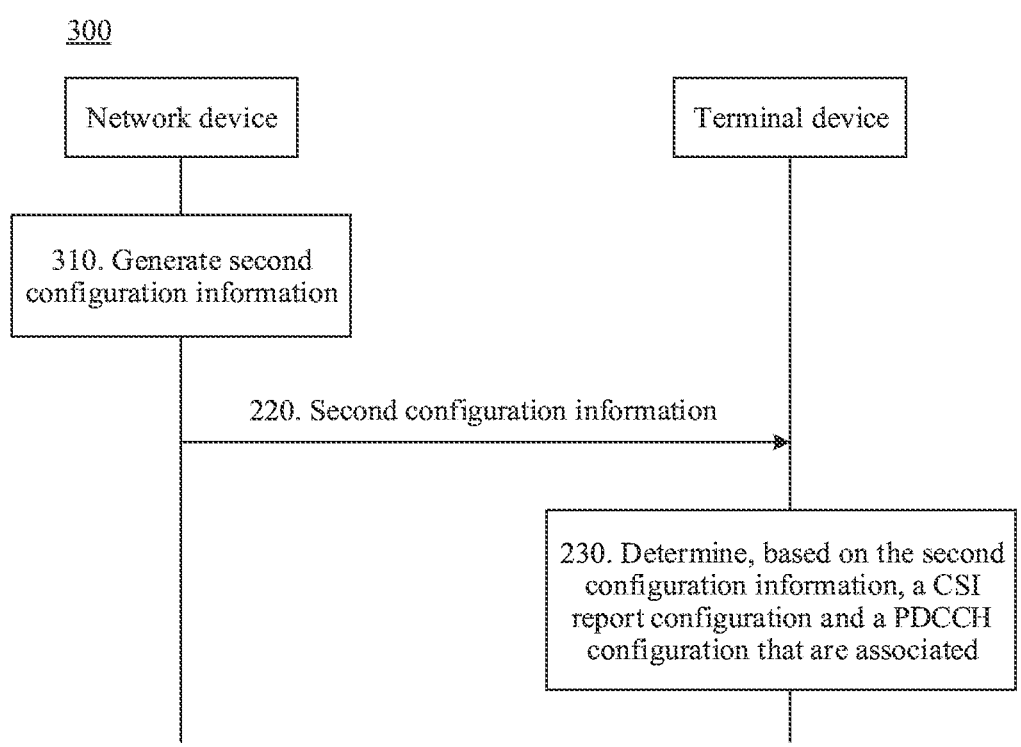
FIG. 3 is a schematic flowchart of a configuration information sending and receiving method according to an embodiment of this application.

FIG. 3 is a schematic flowchart of a configuration method 300 according to an embodiment of this application and from a device interaction perspective. As shown in the figure, the method 300 may include step 310 to step 330. The following describes the steps in the method 300 in detail.

In step 310, a network device generates second configuration information, where the second configuration information may be used to indicate a CSI report configuration and a PDCCH configuration parameter that are associated.

In this application, for ease of differentiation and description, configuration information used to indicate the CSI report configuration and the PDCCH configuration that are associated is referred to as the second configuration information. The PDCCH configuration parameter may include a PDCCH configuration in a higher layer parameter and a downlink control parameter of a PDCCH. As described above, the CSI report configuration may be used to determine a PUCCH resource, and the PDCCH configuration may be used to determine a search space of the PDCCH.

The CSI report configuration and the PDCCH configuration parameter that are associated may mean that the CSI report configuration and the PDCCH configuration parameter may be configured based on a same network device. In other words, the CSI report configuration and the PDCCH configuration parameter that are associated may correspond to a same network device.

In a multi-DCI scheduling scenario, a terminal device may receive a plurality of CSI measurement configurations, and each CSI measurement configuration may correspond to one network device. Each CSI measurement configuration may include one or more CSI report configurations. Therefore, in this embodiment of this application, the CSI report configuration may be associated with a PDCCH configuration, or a CSI measurement configuration to which the CSI report configuration belongs may be associated with a PDCCH configuration. When the CSI measurement configuration is associated with the PDCCH configuration, all of one or more CSI report configurations in the CSI measurement configuration may be associated with the PDCCH configuration.

When a CSI report configuration corresponds to a network device, a resource determined based on the CSI report configuration may be used to transmit a PUCCH to the network device, and information transmitted on the resource determined based on the CSI report configuration may be information sent to the network device. The network device may determine a resource based on the same CSI report configuration, and receive the PUCCH on the resource. The resource that is determined based on the CSI report configuration and that is used to transmit the PUCCH may be referred to as the PUCCH resource.

Because the PUCCH resource is determined based on the CSI report configuration, information transmitted on the PUCCH may be, for example, CSI fed back to the network device, or may be HARQ information fed back for a PDSCH (for example, an SPS PDSCH) that has no corresponding PDCCH and CSI fed back to the network device.

When the CSI report configuration is associated with the PDCCH configuration parameter, a network device from which a PDCCH received (or blindly detected) based on the PDCCH configuration parameter comes and a network device to which the PUCCH is sent may be a same network device.

It should be noted that the network device configured to send the second configuration information may be a network device corresponding to the CSI report configuration or the PDCCH configuration, or may be another network device. This is not limited in this application.

In a possible scenario, the terminal device may receive the PDCCH from the network device based on the PDCCH configuration. The network device may activate semi-persistent CSI reporting of the terminal device by using the PDCCH. The terminal device may determine, based on the CSI report configuration associated with the PDCCH configuration, a PUCCH resource used to transmit UCI, and further send the UCI on the PUCCH resource. The network device may receive the UCI on the PUCCH resource.

On the contrary, if the terminal device does not know an association relationship between the CSI report configuration and the PDCCH configuration, when receiving a PDCCH, the terminal device may not know which CSI report configuration should be used to determine a PUCCH resource used to transmit UCI. Therefore, a PUCCH resource that is determined by the terminal device and that is used to transmit UCI may be different from a PUCCH resource that is determined by the network device and that is used to receive the UCI. The network device cannot receive the CSI reported by the terminal device, and therefore cannot obtain an accurate channel state. Consequently, a used modulation and coding scheme (MCS) may be inappropriate, or a precoding matrix does not adapt to the channel state, resulting in deterioration of data transmission performance.

The following describes in detail a specific method for indicating, by using the second configuration information, the CSI report configuration and the PDCCH configuration that are associated and a specific method for indicating, by using second configuration information, the CSI report configuration and the downlink control parameter of the PDCCH that are associated.

In this embodiment, the network device may configure an association relationship between a CSI report configuration and a PDCCH configuration, to help the terminal device determine a CSI report configuration and a PDCCH configuration that may correspond to a same network device. Specifically, the network device indicates, to the terminal device in any one of the following listed manners, the CSI report configuration and the PDCCH configuration that are associated:

Manner 1: An indication field is added to the CSI report configuration, to indicate the associated PDCCH configuration.

Manner 2: An indication field is added to the CSI measurement configuration to which the CSI report configuration belongs, to indicate the associated PDCCH configuration.

Manner 3: An indication field is added to the PDCCH configuration, to indicate the associated CSI report configuration.

Manner 4: An indication field is added to the PDCCH configuration, to indicate the associated CSI measurement configuration.

Manner 5: The CSI report configuration and the PDCCH configuration that are associated are indicated in a serving cell configuration.

The following describes in detail the five manners listed above.

In the manner 1, the network device may add the indication field to the CSI report configuration to indicate the associated PDCCH configuration. For example, the CSI report configuration may be configured by using a higher layer parameter CSI-ReportConfig IE, and the network device may add a PDCCH-Config ID field to the CSI-ReportConfig IE, to indicate an indication of the associated PDCCH configuration. In this manner, the second configuration information may be the CSI report configuration, for example, the CSI-ReportConfig IE or other signaling that may be used to implement a function the same as or similar to that of the CSI report configuration.

In the manner 2, the network device may add the indication field to the CSI measurement configuration to indicate the associated PDCCH configuration. For example, the CSI measurement configuration may be configured by using a higher layer parameter CSI-MeasConfig IE, and the network device may add a PDCCH-Config ID field to the CSI-MeasConfig IE, to indicate an identifier of the associated PDCCH configuration. In this manner, the second configuration information may be the CSI measurement configuration, for example, the CSI-MeasConfig IE or other signaling that may be used to implement a function the same as or similar to that of the CSI measurement configuration.

It should be understood that, in the foregoing manner 1 and manner 2, the indication of the PDCCH configuration may be, for example, an identifier of the PDCCH configuration, or other information that may be used to indicate the PDCCH configuration. A specific form of the indication of the PDCCH configuration is not limited in this application.

It should be noted that, because each CSI measurement configuration may include one or more CSI report configurations, if the network device configures an association relationship between the CSI measurement configuration and the PDCCH configuration by using the second configuration information, that is, in the manner 2, one or more CSI report configurations in the CSI measurement configuration may be associated with a same PDCCH configuration. If the network device configures an association relationship between the CSI report configuration and the PDCCH configuration by using the second configuration information, that is, in the manner 1, PDCCH configurations associated with CSI report configurations in a same CSI measurement configuration may be the same or may be different. This is not limited in this application.

In the manner 3, the network device may add the field to the PDCCH configuration to indicate the associated CSI report configuration. For example, the PDCCH configuration may be configured by using a higher layer parameter PDCCH-Config IE, and the network device may add a CSI-ReportConfig ID field to the PDCCH-Config IE, to indicate an indication of the associated CSI report configuration. In this manner, the second configuration information may be the PDCCH configuration, for example, the PDCCH-Config IE or other signaling that may be used to implement a function the same as or similar to that of the PDCCH configuration.

It should be understood that the indication of the CSI report configuration may be, for example, an identifier of the CSI report configuration, or other information that may be used to indicate the CSI report configuration. A specific form of the indication of the CSI report configuration is not limited in this application.

Similar to the manner 1, in the manner 3, because the network device configures an association relationship between the CSI report configuration and the PDCCH configuration by using the second configuration information, PDCCH configurations associated with CSI report configurations in a same CSI measurement configuration may be the same or may be different. This is not limited in this application.

In the manner 4, the network device may add the field to the PDCCH configuration to indicate the associated CSI measurement configuration. For example, the PDCCH configuration may be configured by using a higher layer parameter PDCCH-Config IE, and the network device may add a CSI-MeasConfig ID field to the PDCCH-Config IE, to indicate an indication of the associated CSI measurement configuration. In this manner, the second configuration information may be the PDCCH configuration, for example, the PDCCH-Config IE or other signaling that may be used to implement a function the same as or similar to that of the PDCCH configuration.

It should be understood that the indication of the CSI measurement configuration may be, for example, an identifier of the CSI measurement configuration, or other information that may be used to indicate the CSI measurement configuration. A specific form of the indication of the CSI measurement configuration is not limited in this application.

Similar to the manner 2, in the manner 4, because the network device configures an association relationship between the CSI measurement configuration and the PDCCH configuration by using the second configuration information, one or more CSI report configurations in the CSI measurement configuration may be associated with a same PDCCH configuration.

In the manner 5, the network device may indicate, by using the serving cell configuration, the CSI report configuration and the PDCCH configuration that are associated. The second configuration information may be the serving cell configuration, for example, a ServingCellConfig IE, or other signaling that may be used to implement a function the same as or similar to that of the serving cell configuration.

In a possible design, the serving cell configuration may include one or more CSI measurement configurations and one or more sets of BWP downlink parameters. Each CSI measurement configuration includes one or more CSI report configurations, each set of BWP downlink parameters may include one or more sets of BWP downlink dedicated parameters, and each set of BWP downlink dedicated parameters may include one or more PDCCH configurations. When a CSI report configuration is associated with a PDCCH configuration, an identifier of a CSI measurement configuration to which the CSI report configuration belongs may be the same as an identifier of a BWP downlink dedicated parameter to which the PDCCH configuration belongs. A same serving cell configuration may include downlink parameters configured for one or more BWPs, that is, one or more sets of BWP downlink parameters, and each set of BWP downlink parameters include one or more sets of BWP downlink dedicated parameters. Therefore, if an identifier of a BWP downlink dedicated parameter in each set of BWP downlink parameters is locally configured, a plurality of sets of BWP downlink parameters may include BWP downlink dedicated parameters having a same identifier. In other words, each CSI report configuration in the CSI measurement configuration may be associated with one or more PDCCH configurations.

For example, BWP downlink parameters configured for each BWP in the serving cell configuration may include a BWP downlink dedicated parameter 0 and a BWP downlink dedicated parameter 1, and the serving cell configuration may further include a CSI measurement configuration 0 and a CSI measurement configuration 1. In this case, a PDCCH configuration in the BWP downlink dedicated parameter 0 in the BWP downlink parameters configured for each BWP may be associated with a CSI measurement configuration in the CSI measurement configuration 0, and a PDCCH configuration in the BWP downlink dedicated parameter 1 in the BWP downlink parameters configured for each BWP may be associated with a CSI measurement configuration in the CSI measurement configuration 1.

For another example, BWP downlink parameters configured for each BWP in the serving cell configuration may include one set of BWP downlink dedicated parameters, and the serving cell configuration may further include one CSI measurement configuration. In this case, a PDCCH configuration in the BWP downlink dedicated parameter in the BWP downlink parameters configured for each BWP may be associated with the CSI measurement configuration. In this case, because BWP downlink parameters configured for each BWP include one set of BWP downlink dedicated parameters, and the serving cell configuration includes one CSI measurement configuration, distinguishing does not need to be performed by using identifiers. The PDCCH configuration in the BWP downlink dedicated parameter in the BWP downlink parameters configured for each BWP are associated with the CSI measurement configuration. This may be considered as a special case of that an identifier of a BWP downlink dedicated parameter to which a PDCCH belongs is the same as an identifier of the CSI measurement configuration.

In another possible design, the serving cell configuration includes one or more sets of BWP dedicated parameters, and each set of BWP dedicated parameters may be configured for one BWP, in other words, each set of BWP dedicated parameters correspond to one BWP. Each set of BWP dedicated parameters may include a PDCCH configuration and a CSI report configuration that are associated. Specifically, each set of BWP dedicated parameters may include one set of BWP uplink dedicated parameters, one set of BWP downlink dedicated parameters, and one CSI measurement configuration. Each set of BWP downlink dedicated parameters may include one PDCCH configuration, and each CSI measurement configuration may include one or more CSI report configurations. A PDCCH configuration and a CSI measurement configuration in one set of BWP dedicated parameters may be associated with each other. In other words, a PDCCH configuration and one or more CSI report configurations in a CSI measurement configuration in one set of BWP dedicated parameters are associated with each other.

In still another possible design, BWP uplink parameters configured for each BWP in the serving cell configuration may include one or more sets of BWP uplink dedicated parameters, and BWP downlink parameters configured for each BWP in the serving cell configuration may include one or more sets of BWP downlink dedicated parameters. Each set of BWP uplink dedicated parameters may include one CSI measurement configuration, and each set of BWP downlink dedicated parameters may include one PDCCH configuration. When a CSI report configuration is associated with a PDCCH configuration, the CSI report configuration and the PDCCH configuration may cooperate for a same BWP. In addition, an identifier of a BWP uplink dedicated parameter to which a CSI measurement configuration belongs is the same as an identifier of a BWP downlink dedicated parameter to which the PDCCH configuration belongs, where the CSI report configuration belongs to the CSI measurement configuration. When a CSI report configuration and a PDCCH configuration are configured for a same BWP, a BWP ID indicated in a BWP uplink parameter to which the CSI report configuration belongs may be the same as a BWP ID indicated in a BWP downlink parameter to which the PDCCH configuration belongs.

For example, in the serving cell configuration, BWP downlink parameters configured for a BWP may include a BWP downlink dedicated parameter 0 and a BWP downlink dedicated parameter 1, and BWP uplink parameters configured for the same BWP may include a BWP uplink dedicated parameter 0 and a BWP uplink dedicated parameter 1. In this case, a PDCCH configuration in the BWP downlink dedicated parameter 0 may be associated with a CSI measurement configuration in the BWP uplink dedicated parameter 0, and a PDCCH configuration in the BWP downlink dedicated parameter 1 may be associated with a CSI measurement configuration in the BWP uplink dedicated parameter 1.

For another example, in the serving cell configuration, BWP uplink parameters that may be configured for a BWP may include one set of BWP uplink dedicated parameters, and BWP downlink parameters configured for the same BWP may include one set of BWP downlink dedicated parameters. In this case, a PDCCH configuration in the BWP downlink dedicated parameters is associated with a CSI measurement configuration in the BWP uplink dedicated parameters. In this case, because in the serving cell configuration, parameters configured for a same BWP include one set of BWP uplink dedicated parameters and one set of BWP downlink dedicated parameters, the BWP uplink dedicated parameters and the BWP downlink dedicated parameters may not need to be distinguished by using identifiers. The PDCCH configuration in the BWP downlink dedicated parameters is associated with the CSI measurement configuration in the BWP uplink dedicated parameters configured for the same BWP in the serving cell. This may be considered as a special case of that an identifier of a BWP downlink dedicated parameter to which a PDCCH belongs is the same as an identifier of a BWP uplink dedicated parameter to which the CSI measurement configuration belongs.

In yet another possible design, BWP uplink parameters configured for a BWP in the serving cell configuration may include one or more sets of BWP uplink dedicated parameters, and BWP downlink parameters configured for the same BWP may include one or more sets of BWP downlink dedicated parameters. Each set of BWP uplink dedicated parameters may include one or more CSI measurement configurations, and each set of BWP downlink dedicated parameters may include one or more PDCCH configurations. When a CSI report configuration is associated with a PDCCH configuration, the CSI report configuration and the PDCCH configuration may be configured for a same BWP, an identifier of a BWP uplink dedicated parameter to which a CSI measurement configuration belongs is the same as an identifier of a BWP downlink dedicated parameter to which the PDCCH configuration belongs, and an identifier of the CSI measurement configuration is the same as an identifier of the PDCCH configuration, where the CSI report configuration belongs to the CSI measurement configuration. When a CSI report configuration and a PDCCH configuration are configured for a same BWP, a BWP ID indicated in a BWP uplink parameter to which the CSI report configuration belongs may be the same as a BWP ID indicated in a BWP downlink parameter to which the PDCCH configuration belongs.

For example, in the serving cell configuration, BWP downlink parameters configured for a BWP may include a BWP downlink dedicated parameter 0 and a BWP downlink dedicated parameter 1, and BWP uplink parameters configured for the same BWP may include a BWP uplink dedicated parameter 0 and a BWP uplink dedicated parameter 1. The BWP uplink dedicated parameter 0 may include a CSI measurement configuration 0 and a CSI measurement configuration 1. The BWP uplink dedicated parameter 1 may include a CSI measurement configuration 0 and a CSI measurement configuration 1. The BWP downlink dedicated parameter 0 may include a PDCCH configuration 0 and a PDCCH configuration 1. The BWP downlink dedicated parameter 1 may include a PDCCH configuration 0 and a PDCCH configuration 1. In this case, the CSI measurement configuration 0 in the BWP uplink dedicated parameter 0 is associated with the PDCCH configuration 0 in the BWP downlink dedicated parameter 0, the CSI measurement configuration 1 in the BWP uplink dedicated parameter 0 is associated with the PDCCH configuration 1 in the BWP downlink dedicated parameter 0, the CSI measurement configuration 0 in the BWP uplink dedicated parameter 1 is associated with the PDCCH configuration 0 in the BWP downlink dedicated parameter 1, and the CSI measurement configuration 1 in the BWP uplink dedicated parameter 1 is associated with the PDCCH configuration 1 in the BWP downlink dedicated parameter 1.

For another example, in the serving cell configuration, BWP downlink parameters configured for a BWP may include one set of BWP uplink dedicated parameters, and BWP uplink parameters configured for the same BWP may include one set of BWP downlink dedicated parameters. The BWP uplink dedicated parameters may include a CSI measurement configuration 0 and a CSI measurement configuration 1, and the BWP downlink dedicated parameters may include a PDCCH configuration 0 and a PDCCH configuration 1. In this case, the CSI measurement configuration 0 is associated with the PDCCH configuration 0, and the CSI measurement configuration 1 is associated with the PDCCH configuration 1.

In still another possible design, BWP downlink parameters configured for a BWP in the serving cell configuration may include one or more sets of BWP downlink dedicated parameters. Each set of BWP downlink dedicated parameters may include one CSI measurement configuration and one PDCCH configuration. A CSI measurement configuration and a PDCCH configuration in a same set of BWP downlink dedicated parameters are associated with each other. It may be understood that a CSI measurement configuration and a PDCCH configuration in a same set of BWP downlink dedicated parameters may be configured for a same BWP.

For example, BWP downlink parameters configured for a BWP in the serving cell configuration may include a BWP downlink dedicated parameter 0 and a BWP downlink dedicated parameter 1. The BWP downlink dedicated parameter 0 may include one CSI measurement configuration and one PDCCH configuration, and the BWP downlink dedicated parameter 1 may include one CSI measurement configuration and one PDCCH configuration. In this case, the CSI measurement configuration and the PDCCH configuration in the BWP downlink dedicated parameter 0 are associated, and the CSI measurement configuration and the PDCCH configuration in the BWP downlink dedicated parameter 1 are associated.

In still another possible design, BWP downlink parameters configured for a BWP in the serving cell configuration may include one or more sets of BWP downlink dedicated parameters. Each set of BWP downlink dedicated parameters may include one or more CSI measurement configurations and one or more PDCCH configurations. When a CSI measurement configuration is associated with a PDCCH configuration, the CSI measurement configuration and the PDCCH configuration belong to a same set of BWP downlink dedicated parameters, and an identifier of the CSI measurement configuration is the same as an identifier of the PDCCH configuration. It may be understood that a CSI measurement configuration and a PDCCH configuration in a same set of BWP downlink dedicated parameters may be configured for a same BWP.

For example, BWP downlink parameters configured for a BWP in the serving cell configuration may include a BWP downlink dedicated parameter 0 and a BWP downlink dedicated parameter 1. The BWP downlink dedicated parameter 0 may include a CSI measurement configuration 0, a CSI measurement configuration 1, a PDCCH configuration 0, and a PDCCH configuration 1. The BWP downlink dedicated parameter 1 may include a CSI measurement configuration 0, a CSI measurement configuration 1, a PDCCH configuration 0, and a PDCCH configuration 1. It may be understood that configurations having a same identifier in the BWP downlink dedicated parameter 0 and the BWP downlink dedicated parameter 1 are not necessarily the same. That is, an identifier of a configuration in each set of parameters may be local. In this case, the CSI measurement configuration 0 and the PDCCH configuration 0 in the BWP downlink dedicated parameter 0 are associated, the CSI measurement configuration 1 and the PDCCH configuration 1 in the BWP downlink dedicated parameter 0 are associated, the CSI measurement configuration 0 and the PDCCH configuration 0 in the BWP downlink dedicated parameter 1 are associated, and the CSI measurement configuration 1 and the PDCCH configuration 1 in BWP downlink dedicated parameter 1 are associated.

In still another possible design, all configurations in the serving cell configuration may be associated. In this case, when a CSI measurement configuration and a PDCCH configuration may belong to a same serving cell configuration, the CSI measurement configuration and the PDCCH configuration may be associated.

It should be noted that the CSI report configuration includes configuration information of a CSI resource. Therefore, when a CSI report configuration is associated with a PDCCH configuration, a CSI resource configured in the CSI report configuration is also associated with the PDCCH configuration. For example, the CSI report configuration includes an identifier of a CSI resource configuration. When a CSI report configuration is associated with a PDCCH configuration, a CSI configuration included in the CSI report configuration may also be associated with the PDCCH configuration.

It should be understood that the foregoing lists several possible forms of the second configuration information, but this shall not constitute any limitation on this application. A specific form of the second configuration information is not limited in this application.

It should be further understood that the foregoing lists possible implementations of indicating, by using the second configuration information, the CSI report configuration and the PDCCH configuration that are associated. However, this shall not constitute any limitation on this application. In this application, a possibility that the CSI report configuration and the PDCCH configuration that are associated are indicated in another manner is not excluded. For example, the second configuration information may alternatively be a mapping relationship, for example, a mapping relationship table, or other information that may be used to indicate a mapping relationship. The mapping relationship may be used to indicate a PUCCH configuration and a PDCCH configuration that are corresponding to each other, and the PUCCH configuration and the PDCCH configuration that are corresponding to each other may have an association relationship.

It should be further understood that, for ease of understanding only, the foregoing provides the identifier of the BWP dedicated parameter, the identifier of the BWP uplink dedicated parameter, the identifier of the BWP downlink dedicated parameter, the identifier of the CSI report configuration, the identifier of the CSI measurement configuration, and the identifier of the PDCCH configuration as examples. However, this shall not constitute any limitation on this application. This application imposes no limitation on a quantity of sets of BWP uplink parameters, a quantity of sets of BWP downlink parameters, a quantity of sets of BWP dedicated parameters, a quantity of sets of BWP uplink dedicated parameters, a quantity of sets of BWP downlink dedicated parameters, a quantity of PDCCH configurations, and a quantity of CSI measurement configurations that are configured for a same BWP in the serving cell configuration, and a quantity of CSI report configurations included in each CSI measurement configuration. In addition, a manner that is of allocating an identifier and that is configured, when the serving cell configuration includes a plurality of sets of uplink or downlink parameters, for each of a plurality of sets of dedicated parameters included in each of the plurality of sets of uplink or downlink parameters is not limited in this application either. The identifier that is configured for each set of dedicated parameters may be local, or may be global.

It should be further understood that the foregoing merely shows, for ease of understanding, configuration parameters that may be included in the serving cell configuration. However, this shall not constitute any limitation on this application. The serving cell configuration may further include other configuration parameters than those listed above. This is not limited in this application.

The network device may indicate, to the terminal device in any one of the following listed manners, the CSI report configuration and the downlink control parameter of the PDCCH that are associated:

Manner 1: An indication field is added to the CSI report configuration, to indicate an associated DMRS port group or DMRS CDM group.

Manner 2: An indication field is added to the CSI measurement configuration to which the CSI report configuration belongs, to indicate an associated DMRS port group or DMRS CDM group.

Manner 3: An indication field is added to the CSI report configuration, to indicate an associated TB or CW.

Manner 4: An indication field is added to the CSI measurement configuration to which the CSI report configuration belongs, to indicate an associated TB or CW.

The downlink control parameter has been described in detail in the foregoing method 200 with reference to an example. For brevity, details are not described herein again.

The following describes in detail the four manners listed above.

In the manner 1, the network device may add the field to the CSI report configuration to indicate the associated DMRS port group or DMRS CDM group. For example, the CSI report configuration may be configured by using a higher layer parameter CSIReport-Config IE, and the network device may add a DMRS port group ID field to the CSIReport-Config IE, to indicate the associated DMRS port group; or the network device may add a DMRS CDM group ID field to the CSIReport-Config IE, to indicate the associated DMRS CDM group. In this manner, the second configuration information may be the CSI report configuration, for example, the CSIReport-Config IE or other signaling that may be used to implement a function the same as or similar to that of the CSI report configuration.

In the manner 2, the network device may add the field to the CSI measurement configuration to which the CSI report configuration belongs, to indicate the associated DMRS port group or DMRS CDM group. For example, the CSI measurement configuration may be configured by using a higher layer parameter CSIMeas-Config IE, and the network device may add a DMRS port group ID field to the CSIMeas-Config IE, to indicate the associated DMRS port group; or the network device may add a DMRS CDM group ID field to the CSIMeas-Config IE, to indicate the associated DMRS CDM group. In this manner, the second configuration information may be the CSI measurement configuration, for example, the CSIMeas-Config IE or other signaling that may be used to implement a function the same as or similar to that of the CSI measurement configuration.

Because each CSI measurement configuration may include one or more CSI report configurations, when a CSI measurement configuration is associated with a DMRS port group or a DMRS CDM group, one or more CSI report configurations in the CSI measurement configuration may be associated with the same DMRS port group or DMRS CDM group.

In the manner 3, the network device may add the field to the CSI report configuration to indicate the associated TB or CW. For example, the CSI report configuration may be configured by using a higher layer parameter CSIReport-Config IE, and the network device may add the field used to indicate the TB or the CW to the CSIReport-Config IE, to indicate the associated TB or CW. In this manner, the second configuration information may be the CSI report configuration, for example, the CSIReport-Config IE or other signaling that may be used to implement a function the same as or similar to that of the CSI report configuration.

In the manner 4, the network device may add the field to the CSI measurement configuration to which the CSI report configuration belongs, to indicate the associated TB or CW. For example, the CSI measurement configuration may be configured by using a higher layer parameter CSIMeas-Config IE, and the network device may add the field used to indicate the TB or the CW to the CSIMeas-Config IE, to indicate the associated TB or CW. In this manner, the second configuration information may be the CSI measurement configuration, for example, the CSIMeas-Config IE or other signaling that may be used to implement a function the same as or similar to that of the CSI measurement configuration.

Because each CSI measurement configuration may include one or more CSI report configurations, when a CSI measurement configuration is associated with a TB or a CW, one or more CSI report configurations in the CSI measurement configuration may be associated with the same TB or CW. Because there is a one-to-one correspondence between a TB and a CW, both an associated TB and an associated CW may be indicated in the CSI report configuration or the CSI measurement configuration. When one of the associated TB and the associated CW is indicated in the CSI report configuration or the CSI measurement configuration, the terminal device may determine the other one associated with the PUCCH configuration.

It should be understood that the foregoing lists possible implementations of indicating, by using the second configuration information, the CSI report configuration and the downlink control parameter of the PDCCH that are associated. However, this shall not constitute any limitation on this application. In this application, a possibility that the PUCCH configuration and the downlink control parameter of the PDCCH that are associated are indicated in another manner is not excluded.

In step 320, the network device sends the second configuration information. Correspondingly, in step 32o, the terminal device receives the second configuration information.

Optionally, the second configuration information may be carried in higher layer signaling. The higher layer signaling may be, for example, an RRC message.

It may be understood that when serving a plurality of terminal devices, the network device may send the second configuration information to the terminal devices by using different signaling. When communicating with a plurality of network devices, the terminal device may also receive second configuration information from the plurality of network devices.

In step 330, the terminal device determines, based on the second configuration information, the CSI report configuration and the PDCCH configuration that are associated.

When receiving second configuration information from one or more network devices, the terminal device may determine, in the manner described in step 320, the CSI report configuration and the PDCCH configuration that are associated.

When it is defined in a protocol that the CSI report configuration and the PDCCH configuration are associated in one of the manners listed above, the network device may generate the second configuration information in a manner defined in the protocol, and the terminal device may parse the second configuration information in a manner defined in the protocol, to determine the CSI report configuration and the PDCCH configuration that are associated.

Based on the foregoing technical solutions, the terminal device may determine, based on an association relationship between a CSI report configuration and a PDCCH configuration, which CSI report configurations and PDCCH configurations correspond to a same network device, to determine a resource of a PUCCH according to an indication of the network device, to transmit UCI. The network device may receive the UCI on the corresponding resource. This avoids a case in which the network device cannot receive the UCI because of inconsistent resources determined by the terminal device and the network device. Therefore, the second configuration information is introduced to improve transmission performance and user experience.

Figure 4:
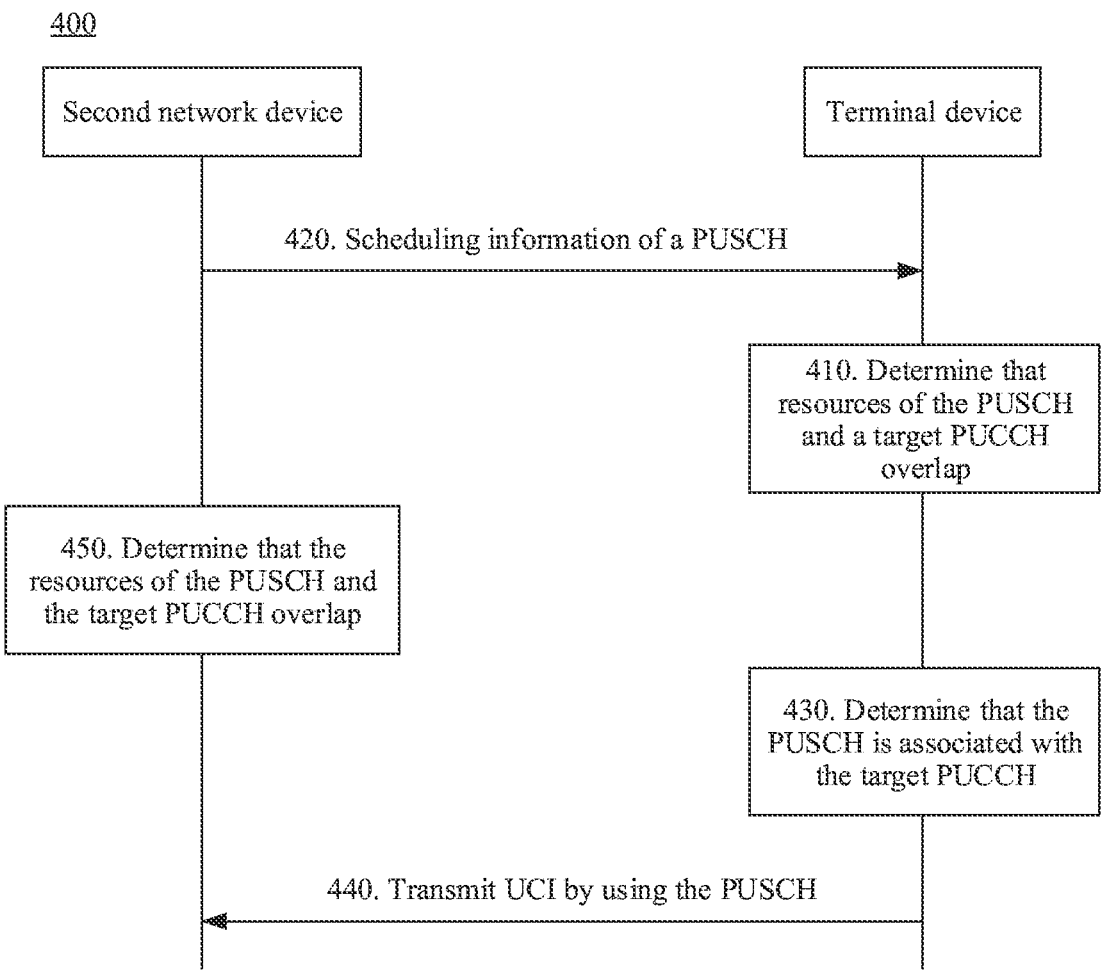
FIG. 4 is a schematic flowchart of an uplink control information sending and receiving method according to an embodiment of this application.

FIG. 4 is a schematic flowchart of a UCI sending and receiving method 400 according to an embodiment of this application and from a device interaction perspective. As shown in the figure, the method 400 may include step 410 to step 450. The following describes the steps in the method 400 in detail.

It should be understood that FIG. 4 shows a specific process in which a terminal device and a network device in a wireless communications system transmit UCI. The terminal device may be any terminal device in the wireless communications system, and the terminal device may communicate with one or more network devices. This is not limited in this application. For a terminal device, a network device serving the terminal device is transparent.

Without loss of generality, the following uses one terminal device as an example to describe in detail a specific process in which the terminal device and the network device transmit UCI. It may be understood that any terminal device in the wireless communications system may send UCI to the network device based on a same technical solution. This is not limited in this application.

In step 410, the terminal device determines that resources of a PUSCH and a target PUCCH overlap.

The PUSCH may be scheduled by the network device by using a PDCCH. For example, the network device may indicate a time domain position and a frequency domain position of the PUSCH by using DCI carried in the PDCCH. The DCI may be, for example, a DCI format 0_0 or a DCI format 0_1.

A PUCCH may be a resource that is determined by the terminal device and that is used to transmit UCI. In this embodiment, for ease of differentiation and description, the PUCCH is denoted as the target PUCCH. It may be understood that a resource of the target PUCCH is obtained from PUCCH resources configured in a PUCCH configuration. In other words, a PUCCH resource pool may be configured in the PUCCH configuration, and the PUCCH resource pool includes a plurality of PUCCH resources.

During single-site scheduling, when resources of a target PUCCH and a PUSCH that are sent to a same network device overlap, the terminal device may send HARQ information and periodic CSI or semi-persistent CSI (CSI for short below) to the network device by using the PUSCH instead of the target PUCCH. That is, the PUSCH may be used to transmit at least one of the HARQ information and the CSI. Therefore, in this embodiment of this application, an example in which the UCI is HARQ information and CSI (for example, the CSI may be periodic CSI or semi-periodic CSI) is used to describe in detail the UCI sending and receiving method. In other words, the UCI may include at least one of the HARQ information and the CSI.

It should be understood that, in this embodiment, for ease of understanding only, the method provided in this embodiment of this application is described by using the HARQ information and the CSI as an example. However, this shall not constitute any limitation on this application. For example, it may also be defined in a protocol that the UCI transmitted on the PUSCH may further include other content, for example, an SR. The method provided in this embodiment of this application is mainly used to determine, when resources of a PUCCH and a PUSCH overlap, whether to transmit UCI by using the PUSCH. Specific content included in the UCI is not limited.

Because information included in the UCI is different, manners of determining the resource of the target PUCCH used to transmit the UCI are also different. The following first uses an example in which the UCI separately includes HARQ information and/or CSI (for example, the CSI may be periodic CSI or semi-periodic CSI) to describe in detail a specific process in which the terminal device determines the resource of the target PUCCH.

Case 1: The UCI Includes Only the HARQ Information.

Because a PDSCH may be a PDSCH scheduled by the network device by using the PDCCH, or may be a semi-persistent scheduling (SPS) PDSCH, a manner of determining a resource of a target PUCCH used to transmit the HARQ information varies with a scheduling manner of the PDSCH.

(A) the PDSCH is a PDSCH Scheduled by Using the PDCCH.

In this embodiment, because a multi-DCI scheduling solution is supported, network devices serving a same terminal device may separately schedule PDSCHs for the terminal device by using DCI in respective PDCCHs. As described above, each network device may schedule a PDSCH by using respective DCI, and indicate, in the respective DCI, a resource of a PUCCH used to transmit a HARQ.

For a same network device, there may be one or more PDSCHs scheduled for a same terminal device. If a same network device schedules a plurality of PDSCHs for a same terminal device, HARQ information fed back for the plurality of PDSCHs may be fed back in one piece of UCI, or may be fed back in a plurality of pieces of UCI. This is not limited in this application.

For a same terminal device, there may be one or more scheduled PDSCHs. This is not limited in this application. If a plurality of PDSCHs are scheduled, the plurality of PDSCHs may be scheduled by a same network device, or may be scheduled by a plurality of network devices. When the plurality of PDSCHs are PDSCHs scheduled by a plurality of network devices, the terminal device may determine, based on scheduling of each network device, a resource of a target PUCCH corresponding to each network device.

In this embodiment, for ease of description, it is assumed that the terminal device receives scheduling from a first network device. Optionally, the method 400 further includes: The terminal device receives scheduling information of a PDSCH, where the scheduling information is used to schedule the PDSCH. Correspondingly, the first network device sends the scheduling information of the PDSCH.

Specifically, the scheduling information may be DCI that is used to schedule the PDSCH and that is sent by the first network device to the terminal device. Specific methods used by the first network device to schedule the PDSCH for the terminal device and indicate a resource of a target PUCCH by using the DCI have been described in detail above. For brevity, details are not described herein again.

As described above, the network device may configure a PUCCH resource list and a PUCCH resource set list for the terminal device by using a higher layer parameter such as a PUCCH-config IE. The terminal device may select a PUCCH resource set based on a length of the to-be-sent UCI, and may further determine the resource of the target PUCCH in the selected PUCCH resource set based on an indication in the DCI.

In other words, when the UCI includes only HARQ information and a PDSCH corresponding to the HARQ information is a PDSCH scheduled by using the DCI, the resource of the target PUCCH may be determined based on the PUCCH configuration.

It should be understood that this is merely an example herein, and describes a step in which the first network device sends the scheduling information of the PDSCH to the terminal device. However, this should not constitute any limitation on this application. The terminal device may further receive scheduling information that is sent by another network device different from the first network device and that is used to schedule another PDSCH. This is not limited in this application.

(B) The PDSCH is an SPS PDSCH.

When the PDSCH is an SPS PDSCH, the network device may configure, for the terminal device by using an SPS configuration, a resource of a target PUCCH used to transmit HARQ information. Specifically, the network device may indicate a PUCCH resource identifier to the terminal device by using a higher layer parameter such as an SPS-Config IE, for example, indicate a PUCCH-ResourceId in an n1PUCCH-AN field. The terminal device may determine the resource of the target PUCCH based on the PUCCH resource identifier.

In other words, when the UCI includes only HARQ information and a PDSCH corresponding to the HARQ information is an SPS PDSCH, the resource of the target PUCCH may be determined based on the SPS configuration.

Case 2: The UCI Includes Only the CSI.

That the UCI includes only the CSI may be further divided into two cases: The UCI includes only one piece of CSI and the UCI includes a plurality of pieces of CSI.

The terminal device may report one piece of CSI based on a report quantity indicated in one CSI report configuration and a PUCCH resource used for reporting. In other words, one piece of CSI reported by the terminal device corresponds to one CSI report configuration.

As described above, the CSI may be periodic CSI, or may be semi-persistent CSI. The network device may trigger CSI in one or more different periods, or may trigger semi-persistent CSI. When CSI in different periods overlaps in a time period, or periodic CSI and semi-persistent CSI overlap in a time period, the terminal device may report a plurality of pieces of CSI in the time period, for example, report a plurality of pieces of CSI in a same slot. That is, the UCI includes a plurality of pieces of CSI.

When transmitting one piece of CSI, the terminal device may determine the resource of the target PUCCH based on a CSI report configuration and DCI. For example, the resource of the target PUCCH may be determined based on pucch-CSI-ResourceList in the CSI report configuration and an active BWP in the DCI. When transmitting a plurality of pieces of CSI, the terminal device may determine the resource of the target PUCCH based on the PUCCH configuration. For example, the terminal device may determine the resource of the target PUCCH based on multi-CSI-PUCCH-ResourceList in the PUCCH configuration.

In other words, when the UCI includes only the CSI, if a quantity of pieces of CSI is 1, the resource of the target PUCCH may be determined based on the CSI report configuration; if the quantity of pieces of CSI is greater than 1, the resource of the target PUCCH may be determined based on the PUCCH configuration.

Case 3: The UCI Includes the HARQ Information and the CSI.

If a PDSCH is a PDSCH scheduled by using the PDCCH, the terminal device may determine the resource of the target PUCCH based on a PUCCH resource indicator in the DCI carried by the PDCCH. Both the HARQ information and the CSI may be transmitted by using the resource of the target PUCCH. The resource of the target PUCCH may be determined based on the PUCCH configuration.

If a PDSCH is not a PDSCH scheduled by using the PDCCH, the terminal device may determine the resource of the target PUCCH in the manner in Case 2, and both the HARQ information and the CSI may be transmitted by using the resource of the target PUCCH. The resource of the target PUCCH may be determined based on the CSI configuration or the PUCCH configuration.

In conclusion, the resource of the target PUCCH may be determined based on the PUCCH configuration, or may be determined based on the CSI report configuration, or may be determined based on the SPS configuration.

The foregoing describes in detail, with reference to different information included in the UCI, the specific process in which the terminal device determines the resource of the target PUCCH. However, it should be understood that this should not constitute any limitation on this application. Information included in the UCI and a specific method for determining the resource of the target PUCCH by the terminal device are not limited in this application.

Optionally, the method 400 further includes: Step 420. The terminal device receives the scheduling information of the PUSCH, where the scheduling information is used to schedule the PUSCH. For the terminal device, a network device communicating with the terminal device is transparent, and the terminal device does not know a quantity of network devices simultaneously serving the terminal device. Therefore, the terminal device does not know whether the scheduling information of the PUSCH is sent by the first network device. For ease of description and understanding, a network device that sends the scheduling information of the PUSCH is temporarily referred to as a second network device herein. It may be understood that the second network device and the first network device may be a same network device, or may be different network devices. In a subsequent procedure, the terminal device may determine, based on the method provided in this application, whether the second network device and the first network device are a same network device.

Specifically, the scheduling information of the PUSCH may be DCI sent by the second network device to the terminal device. The second network device may indicate information such as a time-frequency resource of the PUSCH and a modulation and coding scheme to the terminal device by using the DCI.

It should be understood that for ease of example only, the figure shows a step in which the second network device sends the scheduling information of the PUSCH to the terminal device. However, this should not constitute any limitation on this application. The terminal device may further receive scheduling information that is sent by another network device different from the second network device and that is used to schedule another PUSCH. This is not limited in this application.

It should be further understood that a sequence of sending and receiving the scheduling information of the PUSCH and the scheduling information of the PDSCH is not limited in this application.

The terminal device may determine, based on the resource of the target PUCCH and the resource of the PUSCH that are determined above, whether the resources of the target PUCCH and the PUSCH overlap. When the resources of the target PUCCH and the PUSCH overlap, the terminal device may perform step 430, and the terminal device determines whether the PUSCH is associated with the target PUCCH.

After determining the target PUCCH and the PUSCH, the terminal device may further determine whether the resources of the target PUCCH and the PUSCH overlap. If the resources do not overlap, the terminal device may directly send the UCI to the first network device by using the PUCCH, and send uplink data to the second network device by using the PUSCH. If the resources overlap, because the terminal device does not know whether the PUCCH and the PUSCH are scheduled by a same network device, to avoid a case in which the network device cannot successfully demodulate and decode a PUSCH after receiving the PUSCH because UCI on a PUCCH is sent on the PUSCH that has no association relationship with the PUCCH, in this embodiment, the terminal device may further determine whether there is an association relationship between the target PUCCH and the PUSCH, or whether the target PUCCH and the PUSCH are sent to a same network device, or whether the first network device and the second network device are a same network device. When determining that there is an association relationship between the target PUCCH and the PUSCH, the terminal device may determine that the target PUCCH and the PUSCH are sent to a same network device. Therefore, the terminal device may transmit, to the network device by using the PUSCH, the UCI originally transmitted by using the target PUCCH. Otherwise, the UCI may not be sent temporarily, that is, the target PUCCH or the PUSCH is not used to transmit the UCI.

As described above, the PUSCH may be scheduled by using the PDCCH, and the terminal device may determine a PDCCH configuration of the PDCCH when receiving the PDCCH. Therefore, when the resource of the target PUCCH is associated with the PDCCH configuration, the PUCCH is associated with the PUSCH.

Because content included in the UCI is different, configuration parameters used to determine the resource of the target PUCCH are also different. For example, when the UCI includes only the HARQ information and the HARQ information is HARQ information fed back for the PDSCH scheduled by using the PDCCH, the resource of the target PUCCH may be determined based on the PUCCH configuration. When the UCI includes only the HARQ information, and the PDSCH corresponding to the HARQ information is not scheduled by using the PDCCH (for example, an SPS PDSCH), the resource of the target PUCCH may be determined based on the SPS configuration. When the UCI includes only one piece of CSI, the resource of the target PUCCH may be determined based on the CSI report configuration. When the UCI includes only a plurality of pieces of CSI, the resource of the target PUCCH may be determined based on the PUCCH configuration. When the UCI includes the HARQ information and the CSI (one or more pieces), and the HARQ information is HARQ information fed back for the PDSCH scheduled by using the PDCCH, the resource of the target PUCCH may be determined based on the PUCCH configuration. When the UCI includes the HARQ information and one piece of CSI, and the PDSCH corresponding to the HARQ information is not scheduled by using the PDCCH (for example, an SPS PDSCH), the resource of the target PUCCH may be determined based on the CSI report configuration. When the UCI includes the HARQ information and a plurality of pieces of CSI, and the PDSCH corresponding to the HARQ information is not scheduled by using the PDCCH (for example, an SPS PDSCH), the resource of the target PUCCH may be determined based on the PUCCH configuration.

In the following content, for ease of description, the PUCCH configuration used to determine the resource of the target PUCCH is denoted as a PUCCH configuration of the target PUCCH, the CSI report configuration used to determine the resource of the target PUCCH is denoted as a CSI report configuration of the target PUCCH, and the SPS configuration used to determine the resource of the target PUCCH is denoted as an SPS configuration of the target PUCCH.

When the resource of the target PUCCH is determined based on the PUCCH configuration, the terminal device may determine, based on the first configuration information in the method 200, a PUCCH configuration associated with the PDCCH configuration, and further determine whether the PUCCH configuration of the target PUCCH is associated with the PDCCH configuration.

In addition, when scheduling the PDSCH by using the PDCCH, the network device may indicate the resource of the target PUCCH. Alternatively, the terminal device may directly determine, depending on whether the PDCCH used to schedule the PDSCH and the PDCCH used to schedule the PUSCH belong to a same PDCCH configuration, whether the PUCCH configuration of the target PUCCH is associated with the PDCCH configuration.

In other words, the resource of the PUSCH is scheduled by using a first PDCCH, and the resource of the PUCCH is indicated by using a second PDCCH. The terminal device may determine whether the target PUCCH is associated with the PUSCH by determining whether a PDCCH configuration based on which the second PDCCH is received is the same as a PDCCH configuration based on which the first PDCCH is received. When the PDCCH configuration of the first PDCCH and the PDCCH configuration of the second PDCCH are a same PDCCH configuration, it is considered that the target PUCCH is associated with the PUSCH.

When the resource of the target PUCCH is determined based on the CSI report configuration, the terminal device may determine, based on the second configuration information in the method 300, a CSI report configuration associated with the PDCCH configuration, and further determine whether the CSI report configuration of the target PUCCH is associated with the PDCCH configuration.

With reference to the method 200, the foregoing describes in detail the specific process in which the network device indicates, to the terminal device by using the first configuration information, the PUCCH configuration and the PDCCH configuration that are associated. With reference to the method 300, the foregoing describes in detail the specific process in which the network device indicates, by using the second configuration information, the CSI report configuration and the PDCCH configuration that are associated. The terminal device may determine, based on the first configuration information, the PUCCH configuration and the PDCCH configuration that are associated, and may further determine, based on the second configuration information, the CSI report configuration and the PDCCH configuration that are associated. Specific processes thereof are described in detail in the foregoing methods 200 and 300. For brevity, details are not described herein again.

When the PDSCH does not have a corresponding PDCCH, for example, the PDSCH may be a semi-persistent scheduling (SPS) PDSCH, the resource of the target PUCCH may be determined based on the SPS configuration. The SPS configuration belongs to a BWP downlink dedicated parameter, and the PDCCH configuration used to schedule the PUSCH also belongs to a BWP downlink dedicated parameter. Therefore, when the BWP downlink dedicated parameter to which the SPS configuration of the target PUCCH belongs and the BWP downlink dedicated parameter to which the PUCCH configuration of the PDCCH belongs are of a same set of BWP downlink dedicated parameters, it may be considered that the target PUCCH is associated with the PUSCH.

Optionally, the network device may further configure an associated PDCCH configuration for a configuration parameter of each PUCCH resource in the PUCCH configuration. Specifically, the PUCCH configuration may include configuration parameters of a plurality of PUCCH resources, and a configuration parameter of each PUCCH resource may include an indication of an associated PDCCH configuration. The indication of the PDCCH configuration may be, for example, an identifier of the PDCCH configuration, or other information that may be used to indicate the PDCCH configuration. The method for indicating the PDCCH configuration has been described in detail above with reference to different manners. For brevity, details are not described herein again.

This manner may be understood as that the network device configures an associated PDCCH configuration for a configuration parameter of each PUCCH resource in the PUCCH resource pool. The target PUCCH may be obtained from the PUCCH resource pool. Therefore, the PDCCH configuration associated with the target PUCCH may be determined based on the associated PDCCH configuration configured by the network device for each PUCCH resource.

When scheduling the PUSCH by using the PDCCH, the network device may determine, depending on whether a PDCCH configuration for receiving the PDCCH and a PDCCH configuration associated with the target PUCCH are a same PDCCH configuration, whether the target PUCCH is associated with the PUSCH.

Further, when determining, based on the PDCCH configuration, whether the PUSCH is associated with the PUCCH, the terminal device may further extend this association relationship. That is, when the PDCCH configuration associated with the PUCCH resource and the PDCCH configuration of the PDCCH used to schedule the PUSCH belong to a same PDCCH configuration group, it may be considered that the PUCCH is associated with the PUSCH.

Specifically, when the first network device and the second network device serve a same terminal device based on a CoMP technology, the first network device and/or the second network device further schedule more spectrum resources for the terminal device based on carrier aggregation. For example, the first network device may send a PDCCH #1 to the terminal device on a CC #1, to schedule a PDSCH #1, and indicate to transmit, on a PUCCH #1, HARQ information fed back for the PDSCH #1. For example, the first network device may further send a PDCCH #2 to the terminal device on the CC #1, to schedule a PUSCH #1. In addition, the first network device may further send a PDCCH #$_3$ to the terminal device on a CC #2, to schedule a PDSCH #2, and indicate that a PUCCH #2 is used to transmit HARQ information fed back for the PDSCH #2.

The PDCCH configuration is configured based on each BWP of each cell. PDCCH configurations based on which the first network device sends the PDCCHs separately on the CC #1 and the CC #2 may be different. In other words, a same network device may send PDCCHs to the terminal device based on two or more different PDCCH configurations.

If the terminal device determines the associated PUCCH and the associated PUSCH based on different PDCCH configurations, the terminal device may use PUCCHs and PUSCHs scheduled by a same network device as PUCCHs and PUSCHs scheduled by different network devices. If resources of the PUCCH #1, the PUCCH #2, and the PUSCH #1 overlap, the terminal device may send, to the first network device by using the PUSCH #1, only UCI generated based on the CC #1. The UCI may include a HARQ fed back for the PDSCH #1, and does not include a HARQ for the PDSCH #2. However, actually, because the PUCCH #1, the PUCCH #2, and the PUSCH #1 are all sent to the first network device, the first network device may receive, on the PUSCH #1, UCI generated based on the CC #1 and the CC #2. Because a length of the UCI sent by the terminal device may be different from a length of UCI expected by the first network device, the first network device may fail to correctly obtain, through parsing, information in the UCI.

Therefore, this application further proposes a concept of a PDCCH configuration group. Each PDCCH configuration group may include a plurality of PDCCH configurations, and each PDCCH configuration is configured based on one BWP in one cell. The PDCCH configuration group may be configured by using higher layer signaling. For example, an included PDCCH configuration may be indicated in a PDCCH configuration group. Alternatively, when each PDCCH configuration is configured by using higher layer signaling, an indication field may be added to indicate a PDCCH configuration group to which the PDCCH configuration belongs.

A same network device may send PDCCHs to the terminal device in different cells based on PDCCH configurations in the PDCCH configuration group. When determining that PDCCH configurations on which the blindly detected PDCCHs are based belong to a same PDCCH configuration group, the terminal device may consider that the PDCCHs blindly detected based on the same PDCCH configuration group are sent by a same network device. Therefore, the terminal device may consider that the PUCCH configuration and the PUSCH configuration are associated based on a same PDCCH configuration group.

The foregoing listed methods for determining whether the target PUCCH is associated with the PUSCH are all examples, and should not constitute any limitation on this application. A specific method for determining whether the target PUCCH is associated with the PUSCH is not limited in this application. Several methods that may be used for determining whether the target PUCCH is associated with the PUSCH are further provided below. It should be noted that, in the following provided several methods for determining whether the target PUCCH is associated with the PUSCH, the PUSCH may be a PUSCH scheduled by using a PDCCH, or may be a PUSCH with a configured grant. This is not limited in this application.

In an implementation, because the resource of the target PUCCH may be determined based on the PUCCH configuration, when the PUCCH is associated with the PUSCH, the PUCCH configuration of the target PUCCH may be associated with the PUSCH configuration of the PUSCH, or may be associated with a configured grant (ConfiguredGrant) configuration of the PUSCH. The PUSCH configuration of the PUSCH may be used to determine a transmission parameter of the PUSCH scheduled by using the PDCCH, and the ConfiguredGrant configuration of the PUSCH may be used to determine a resource of the PUSCH with the configured grant.

If the resource of the target PUCCH is determined based on the PUCCH configuration, and the PUSCH is a PUSCH scheduled by using the PDCCH, when there is an association relationship between the PUCCH and the PUSCH, the PUCCH and the PUSCH may meet at least one of the following listed conditions:

(i) The PUCCH configuration of the PUCCH and the PUSCH configuration of the PUSCH belong to a same BWP uplink (UL) dedicated parameter.

(ii) The PUCCH configuration of the PUCCH and the PUSCH configuration of the PUSCH belong to a same BWP uplink dedicated parameter, and an identifier of the PUCCH configuration is the same as an identifier of the PUSCH configuration.

(iii) The PUCCH configuration of the PUCCH includes an indication of the PUSCH configuration of the PUSCH.

(iv) The PUSCH configuration of the PUSCH includes an indication of the PUCCH configuration of the PUCCH.

(v) The PUSCH configuration of the PUSCH and the PUCCH configuration of the PUCCH are associated with a same PDCCH configuration.

(vi) The PUSCH configuration of the PUSCH and the PUCCH configuration of the PUCCH belong to a same serving cell configuration.

(vii) A transmit beam used to send the PUCCH and a PUSCH transmit beam used to send the PUSCH belong to a same transmit beam group.

The conditions (i) to (vii) listed above may be understood as one or more conditions met by the PUCCH configuration and the PUSCH configuration that are associated. The following describes in detail the conditions listed above.

Condition (i)

As described above, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one PUCCH configuration and one PUSCH configuration. A PUCCH configuration and a PUSCH configuration that are configured in a same set of BWP uplink dedicated parameters may be considered as being configured based on a same network device. For example, a PUCCH resource determined based on a PUCCH configuration is used to transmit UCI to be sent to a network device, and a transmission parameter determined based on a PUSCH configuration is used to transmit a PUSCH to the same network device. Therefore, a PUCCH configuration and a PUSCH configuration that are configured in a same set of uplink dedicated parameters may be considered as being associated.

Condition (ii)

In this embodiment, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one or more PUCCH configurations and one or more PUSCH configurations. Each PUCCH configuration may be distinguished by using a PUCCH configuration identifier, and each PUSCH configuration may be distinguished by using a PUSCH configuration identifier. A PUCCH configuration and a PUSCH configuration that are configured with a same identifier may be considered as being configured based on a same network device. Therefore, a PUCCH configuration and a PUSCH configuration that are configured with a same identifier in a same set of BWP uplink dedicated parameters may be considered as being associated.

Condition (iii)

As described above, the network device may configure a PUCCH resource for the terminal device by using a PUCCH configuration. In this embodiment, the PUCCH configuration may include an indication of an associated PUSCH configuration. The network device may add, to the PUCCH configuration, a field used to indicate the PUSCH configuration, to indicate the associated PUSCH configuration. The indication of the PUSCH configuration may be, for example, an identifier of the PUSCH configuration, or other information that may be used to indicate the PUSCH configuration. When the network device indicates a PUSCH configuration in the PUCCH configuration, it may be considered that the PUCCH configuration and the PUSCH configuration indicated by the PUCCH configuration are configured based on a same network device. Therefore, the PUCCH configuration and the PUSCH configuration indicated by the PUCCH configuration may be considered as being associated.

Condition (iv)

The condition (iv) is similar to the condition (iii). The PUSCH configuration may include an indication of an associated PUCCH configuration. The network device may add, to the PUSCH configuration, a field used to indicate the PUCCH configuration, to indicate the associated PUCCH configuration. The indication of the PUCCH configuration may be, for example, an identifier of the PUCCH configuration, or other information that may be used to indicate the PUCCH configuration. When the network device indicates a PUCCH configuration in the PUSCH configuration, it may be considered that the PUSCH configuration and the PUCCH configuration indicated by the PUSCH configuration are configured based on a same network device. Therefore, the PUSCH configuration and the PUCCH configuration indicated by the PUSCH configuration may be considered as being associated.

Condition (v)

The PUCCH configuration and the PUSCH configuration may alternatively be associated through a PDCCH configuration.

In this embodiment, the PUCCH configuration may include an indication of an associated PDCCH configuration, and the PUSCH configuration may also include the indication of the associated PDCCH configuration. The network device separately adds, to the PUCCH configuration and the PUSCH configuration, a field used to indicate the PDCCH configuration, to indicate the associated PDCCH configuration. The indication of the PDCCH configuration may be, for example, an identifier of the PDCCH configuration, or other information that may be used to indicate the PDCCH configuration. When the network device separately indicates a same PDCCH configuration in the PUCCH configuration and the PUSCH configuration, it may be considered that the PUCCH configuration and the PUSCH configuration are associated with the same PDCCH configuration, and the PUSCH configuration is also associated with the PUCCH configuration.

Further, the condition (v) may be further extended to that the associated PDCCH configuration indicated in the PUSCH configuration and the associated PDCCH configuration indicated in the PUCCH configuration belong to a same PDCCH configuration group.

The concept of the PDCCH configuration group is described in detail above. For brevity, details are not described herein again.

When the resource of the PUCCH is determined by the PUCCH configuration, if the PDCCH configuration associated with the PUCCH configuration of the PUCCH and the PDCCH configuration associated with the PUSCH configuration belong to a same PDCCH configuration group, it may be considered that the PUCCH is associated with the PUSCH.

Condition (i)

In this embodiment, the network device may configure a PUSCH configuration and a PUCCH configuration for the terminal device by using a serving cell configuration. For example, the network device may configure one or more BWPs for each terminal device by using a higher layer parameter ServingCellConfig IE. A PUCCH configuration and a PUSCH configuration that are configured in a same serving cell configuration may be considered as being associated.

Condition (vii)

A transmit beam used to send the PUCCH and a PUSCH transmit beam used to send the PUSCH may belong to a same transmit beam group. As described above, the terminal device may determine a selected spatial relation based on the PUCCH configuration and an SRI indicated by the network device, to determine a transmit beam used to send the PUCCH. The terminal device may determine a selected SRS resource based on an SRS configuration and the SRI indicated by the network device, to determine a transmit beam used to send the PUSCH.

In this embodiment, the network device may indicate, in the PUCCH configuration, a reference signal resource group to which each reference signal resource belongs. For example, a field is added to PUCCH spatial relation information (PUCCH-SpatialRelationInfo) in the PUCCH configuration, to indicate a reference signal resource group to which an SSB resource belongs, a non-zero power CSI-RS resource, and a reference signal resource group to which an SRS belongs. For another example, a field is added to PUCCH-SpatialRelationInfo in the PUCCH configuration, to indicate a reference signal resource group to which all reference signal resources defined in PUCCH-SpatialRelationInfo belong.

The field may be, for example, a reference signal resource group identifier, an antenna panel identifier, or other information that may be used to distinguish between different reference signal resource groups.

Correspondingly, the network device may indicate, in the SRS configuration, a reference signal resource group to which each reference signal resource belongs. For example, a field is added to SRS spatial relation information (SRS-SpatialRelationInfo) in the SRS configuration, to indicate a reference signal resource group to which an SSB resource belongs, a non-zero power CSI-RS resource, and a reference signal resource group to which an SRS belongs. For another example, a field is added to SRS-SpatialRelationInfo in the SRS configuration, to indicate a reference signal resource group to which all reference signal resources defined in SRS-SpatialRelationInfo belong.

The field may be, for example, a reference signal resource group identifier, an antenna panel identifier, or other information that may be used to distinguish between different reference signal resource groups.

Based on the foregoing design, transmit beams determined by reference signal resources that belong to a same reference signal resource group may belong to a same transmit beam group, or transmit beams determined by reference signal resources that belong to a same reference signal resource group may be transmitted by antennas on a same antenna panel.

When a reference signal resource in a spatial relation (that is, a spatial relation used for a PUCCH) activated by higher layer signaling (for example, a MAC-CE) received by the terminal device and a reference signal resource in a spatial relation (that is, a spatial relation used for a PUSCH) indicated by physical layer signaling (for example, DCI) belong to a same reference signal resource group, a transmit beam of the PUCCH and a transmit beam of the PUSCH belong to a same transmit beam group. In this case, it may be considered that the PUCCH is associated with the PUSCH.

If the resource of the target PUCCH is determined based on the PUCCH configuration, and the PUSCH is a PUSCH with a configured grant, when there is an association relationship between the PUCCH and the PUSCH, the PUCCH and the PUSCH may meet at least one of the following listed conditions:

(i) The PUCCH configuration of the PUCCH and the ConfiguredGrant configuration of the PUSCH belong to a same BWP uplink (UL) dedicated parameter.

(ii) The ConfiguredGrant configuration of the PUCCH and the PUSCH configuration of the PUSCH belong to same BWP UL dedicated, and an identifier of the PUCCH configuration is the same as an identifier of the PUSCH configuration.

(iii) The PUCCH configuration of the PUCCH includes an indication of the ConfiguredGrant configuration of the PUSCH.

(iv) The ConfiguredGrant configuration of the PUSCH includes an indication of the PUCCH configuration of the PUCCH.

(v) The ConfiguredGrant configuration of the PUSCH and the PUCCH configuration of the PUCCH belong to a same serving cell configuration.

(vi) A transmit beam used to send the PUCCH and a PUSCH transmit beam used to send the PUSCH belong to a same transmit beam group.

The conditions (i) to (vii) listed above may be understood as one or more conditions met by the associated PUCCH configuration and ConfiguredGrant configuration. The following describes in detail the conditions listed above.

Condition (i)

As described above, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one PUCCH configuration and one ConfiguredGrant configuration. A PUCCH configuration and a ConfiguredGrant configuration that are configured in a same set of BWP uplink dedicated parameters may be considered as being configured based on a same network device. For example, a PUCCH resource determined based on a PUCCH configuration is used to transmit UCI to be sent to a network device, and a resource determined based on a ConfiguredGrant configuration may be used to transmit a PUSCH to the same network device. Therefore, a PUCCH configuration and a ConfiguredGrant configuration that are configured in a same set of uplink dedicated parameters may be considered as being associated.

Condition (ii)

In this embodiment, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one or more PUCCH configurations and one or more ConfiguredGrant configurations. Each PUCCH configuration may be distinguished by using a PUCCH configuration identifier, and each ConfiguredGrant configuration may be distinguished by using a ConfiguredGrant configuration identifier. A PUCCH configuration and a ConfiguredGrant configuration that are configured with a same identifier may be considered as being configured based on a same network device. Therefore, a PUCCH configuration and a ConfiguredGrant configuration that are configured with a same identifier in a same set of BWP uplink dedicated parameters may be considered as being associated.

Condition (iii)

As described above, the network device may configure a PUCCH resource for the terminal device by using a PUCCH configuration. In this embodiment, the PUCCH configuration may include an indication of an associated ConfiguredGrant configuration. The network device may add, to the PUCCH configuration, a field used to indicate the ConfiguredGrant configuration, to indicate the associated ConfiguredGrant configuration. The indication of the ConfiguredGrant configuration may be, for example, an identifier of the ConfiguredGrant configuration, or other information that may be used to indicate the ConfiguredGrant configuration. When the network device indicates a ConfiguredGrant configuration in the PUCCH configuration, it may be considered that the PUCCH configuration and the ConfiguredGrant configuration indicated by the PUCCH configuration are configured based on a same network device. Therefore, the PUCCH configuration and the ConfiguredGrant configuration indicated by the PUCCH configuration may be considered as being associated.

Condition (iv)

The condition (iv) is similar to the condition (iii). The ConfiguredGrant configuration may include an indication of an associated PUCCH configuration. The network device may add, to the ConfiguredGrant configuration, a field used to indicate the PUCCH configuration, to indicate the associated PUCCH configuration. The indication of the PUCCH configuration may be, for example, an identifier of the PUCCH configuration, or other information that may be used to indicate the PUCCH configuration. When the network device indicates a PUCCH configuration in the ConfiguredGrant configuration, it may be considered that the ConfiguredGrant configuration and the PUCCH configuration indicated by the ConfiguredGrant configuration are configured based on a same network device. Therefore, the ConfiguredGrant configuration and the PUCCH configuration indicated by the ConfiguredGrant configuration may be considered as being associated.

Condition (v)

In this embodiment, the network device may configure a ConfiguredGrant configuration and a PUCCH configuration for the terminal device by using a serving cell configuration. For example, the network device may configure one or more BWPs for each terminal device by using a higher layer parameter ServingCellConfig IE. A PUCCH configuration and a ConfiguredGrant configuration that are configured in a same serving cell configuration may be considered as being associated.

Condition (vi)

When the PUSCH is determined by using a ConfiguredGrant configuration, a transmit beam used to send the PUSCH may also be determined by an SRS resource determined by using an SRS configuration and an SRI indicated by the network device. The condition that the transmit beam of the PUCCH and the transmit beam of the PUSCH belong to a same transmit beam group has been described in detail above. For brevity, details are not described herein again.

It should be understood that when the PUCCH is associated with the PUSCH, it may be defined in a protocol that the PUCCH and the PUSCH that are associated meet one or more of the conditions listed above. When it is defined in the protocol that the PUCCH and the PUSCH that are associated meet one or more of the conditions listed above, the terminal device may determine, based on the one or more conditions, whether the scheduled PUCCH is associated with the PUSCH.

It should be further understood that when it is defined in the protocol that whether the PUCCH is associated with the PUSCH is determined based on one or more conditions listed above, it does not indicate that the PUCCH and the PUSCH that are associated do not meet the other conditions listed above. For example, when it is defined in the protocol that whether the PUCCH is associated with the PUSCH is determined based on the condition (i) listed above, the PUCCH and the PUSCH may meet both the condition (i) and the condition (v). However, the network device and the terminal device determine, based only on the condition (i), whether the PUCCH is associated with the PUSCH. Even if the PUCCH and the PUSCH meet the condition (v) but does not meet the condition (i), it is still considered that the PUCCH is not associated with the PUSCH.

The terminal device may determine, based on the conditions listed above, whether the scheduled PUCCH is associated with the PUSCH.

In another implementation, because the resource of the target PUCCH may also be determined based on the CSI report configuration, when the PUCCH is associated with the PUSCH, the CSI report configuration of the target PUCCH may be associated with the PUSCH configuration of the PUSCH. Because the CSI report configuration belongs to the CSI measurement configuration, the network device may configure one or more CSI report configurations for the terminal device by using the CSI measurement configuration. Therefore, when the CSI report configuration is associated with the PUSCH configuration, the CSI measurement configuration to which the CSI report configuration belongs may also be associated with the PUSCH configuration. The PUSCH configuration of the PUSCH may be used to determine the transmission parameter of the PUSCH, and the CSI report configuration of the target PUCCH may be used to determine the resource of the PUCCH.

If the resource of the target PUCCH is determined based on the CSI report configuration, and the PUSCH is a PUSCH scheduled by using the PDCCH, when the PUCCH is associated with the PUSCH, the PUCCH and the PUSCH may meet at least one of the following listed conditions:

(a) A CSI measurement configuration to which the CSI report configuration of the PUCCH belongs (briefly referred to as a CSI measurement configuration of the PUCCH below) and the PUSCH configuration of the PUSCH belong to a same BWP uplink (UL) dedicated parameter.

(b) The CSI measurement configuration of the PUCCH and the PUSCH configuration of the PUSCH belong to a same BWP uplink dedicated parameter, and an identifier of the CSI measurement configuration is the same as an identifier of the PUSCH configuration.

(c) An identifier of a BWP downlink dedicated parameter to which the CSI measurement configuration of the PUCCH belongs is the same as an identifier of a BWP uplink dedicated parameter to which the PUSCH of the PUSCH belongs.

(d) An identifier of a BWP downlink dedicated parameter to which the CSI measurement configuration of the PUCCH belongs is the same as an identifier of a BWP uplink dedicated parameter to which the PUSCH configuration of the PUSCH belongs, and an identifier of the CSI measurement configuration of the PUCCH is the same as an identifier of the PUSCH configuration of the PUSCH.

(e) An identifier of the CSI measurement configuration of the PUCCH is the same as an identifier of a BWP uplink dedicated parameter to which the PUSCH configuration of the PUSCH belongs.

(f) The CSI measurement configuration of the PUCCH includes an indication of the PUSCH configuration of the PUSCH.

(g) The PUSCH configuration of the PUSCH includes an indication of the CSI measurement configuration of the PUCCH.

(h) The PUSCH configuration of the PUSCH and the CSI report configuration of the PUCCH are associated with a same PDCCH configuration.

(i) A transmit beam used to send the PUCCH and a PUSCH transmit beam used to send the PUSCH belong to a same transmit beam group.

The conditions (a) to (i) listed above may be understood as one or more conditions met by the CSI measurement configuration and the PUSCH configuration that are associated. The following describes in detail the conditions listed above.

Condition (a)

As described above, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one CSI measurement configuration and one PUSCH configuration. A CSI measurement configuration and a PUSCH configuration that are configured in a same set of BWP uplink dedicated parameters may be considered as being configured based on a same network device. For example, a PUCCH resource determined based on a CSI measurement configuration is used to transmit UCI to be sent to a network device, and a transmission parameter determined based on a PUSCH configuration is used to transmit a PUSCH to the same network device. Therefore, a CSI measurement configuration and a PUSCH configuration that are configured in a same set of uplink dedicated parameters may be considered as being associated.

Because the CSI measurement configuration includes one or more CSI report configurations, optionally, the condition (a) may be further extended to that the CSI report of the PUCCH and the PUSCH configuration of the PUSCH belong to a same BWP uplink dedicated parameter.

Condition (b)

In this embodiment, the network device may configure a BWP uplink dedicated parameter for the terminal device by using a serving cell configuration. In this embodiment, the network device may configure one or more sets of BWP uplink dedicated parameters for the terminal device, and each set of BWP uplink dedicated parameters may include one or more CSI measurement configurations and one or more PUSCH configurations. Each CSI measurement configuration may be distinguished by using a CSI measurement configuration identifier, and each PUSCH configuration may be distinguished by using a PUSCH configuration identifier. A CSI measurement configuration and a PUSCH configuration that are configured with a same identifier may be considered as being configured based on a same network device. Therefore, a CSI measurement configuration and a PUSCH configuration that are configured with a same identifier in a same set of BWP uplink dedicated parameters may be considered as being associated.

Because the CSI measurement configuration includes one or more CSI report configurations, optionally, the condition (b) may be further extended to that the CSI report configuration of the PUCCH and the PUSCH configuration of the PUSCH belong to a same BWP uplink dedicated parameter, and an identifier of the CSI report configuration is the same as an identifier of the PUSCH configuration.

Condition (c)

The network device may configure a BWP uplink dedicated parameter and a BWP downlink dedicated parameter for the terminal device by using a serving cell configuration. In this embodiment, the network device may configure one or more sets of BWP uplink dedicated parameters and one or more sets of BWP downlink dedicated parameters for the terminal device. Each set of BWP uplink dedicated parameters may include one PUSCH configuration, and each set of BWP downlink dedicated parameters may include one CSI measurement configuration. Each set of BWP uplink dedicated parameters may be distinguished by using identifiers, and each set of BWP downlink dedicated parameters may also be distinguished by using identifiers. Configurations that are in BWP uplink dedicated parameters and BWP downlink dedicated parameters and that are configured with a same identifier may be considered as being configured based on a same network device. Therefore, when the CSI measurement configuration is associated with the PUSCH configuration, an identifier of a BWP downlink dedicated parameter to which the CSI measurement configuration belongs may be same as an identifier of a BWP uplink dedicated parameter to which the PUSCH configuration belongs.

It should be noted that, when the network device configures one set of BWP uplink dedicated parameters and one set of BWP downlink dedicated parameters for the terminal device, the network device may not need to distinguish between the set of BWP uplink dedicated parameters and the set of BWP downlink dedicated parameters by using identifiers. In this case, a configuration in the BWP uplink dedicated parameter and a configuration in the BWP downlink dedicated parameter may be considered as being configured based on a same network device. In other words, a PUSCH configuration in the BWP uplink dedicated parameter and a CSI measurement parameter in the BWP downlink dedicated parameter may be considered as being associated. This may be understood as a special case of that an identifier of a BWP downlink dedicated parameter to which the CSI measurement configuration belongs is the same as an identifier of a BWP uplink dedicated parameter to which the PUSCH configuration belongs.

Because the CSI measurement configuration includes one or more CSI report configurations, optionally, the condition (c) may be further extended to that an identifier of a BWP downlink dedicated parameter to which the CSI report configuration of the PUCCH belongs is the same as an identifier of a BWP uplink dedicated parameter to which the PUSCH configuration of the PUSCH belongs, and an identifier of the CSI report configuration is the same as an identifier of the PUSCH configuration.

Condition (d)

The network device may configure a BWP uplink dedicated parameter and a BWP downlink dedicated parameter for the terminal device by using a serving cell configuration. In this embodiment, the network device may configure one or more sets of BWP uplink dedicated parameters and one or more sets of BWP downlink dedicated parameters for the terminal device. Each set of BWP uplink dedicated parameters may include one or more PUSCH configurations, and each set of BWP downlink dedicated parameters may include one or more CSI measurement configurations. Each set of BWP uplink dedicated parameters may be distinguished by using identifiers, and each set of BWP downlink dedicated parameters may also be distinguished by using identifiers. Each PUSCH configuration may be distinguished by using an identifier, and each CSI measurement configuration may be distinguished by using an identifier. Therefore, when the CSI measurement configuration is associated with the PUSCH configuration, an identifier of a BWP downlink dedicated parameter to which the CSI measurement configuration belongs may be same as an identifier of a BWP uplink dedicated parameter to which the PUSCH configuration belongs, and an identifier of the CSI measurement configuration may also be the same as an identifier of the PUSCH configuration.

Because the CSI measurement configuration includes one or more CSI report configurations, optionally, the condition (d) may be further extended to that an identifier of a BWP downlink dedicated parameter to which the CSI report configuration of the PUCCH belongs is the same as an identifier of a BWP uplink dedicated parameter to which the PUSCH configuration of the PUSCH belongs, and an identifier of the CSI report configuration of the PUCCH is the same as an identifier of the PUSCH configuration of the PUSCH.

Condition (e)

In this embodiment, the network device alternatively configures one or more CSI measurement configurations and one or more sets of BWP uplink dedicated parameters for the terminal device. Each set of BWP uplink dedicated parameters may include one or more PUSCH configurations. When the CSI measurement configuration is associated with the PUSCH configuration, an identifier of the CSI measurement configuration may be the same as an identifier of a BWP uplink dedicated parameter to which the PUSCH configuration of the PUSCH belongs.

Condition (f)

As described above, the terminal device may determine the resource of the PUCCH based on the CSI report configuration. In this embodiment, a CSI measurement configuration to which the CSI report configuration belongs may include an indication of an associated PUSCH configuration. The network device may add, to the CSI measurement configuration, a field used to indicate the PUSCH configuration, to indicate the associated PUSCH configuration. The indication of the PUSCH configuration may be, for example, an identifier of the PUSCH, or other information that may be used to indicate the PUSCH configuration. When the network device indicates a PUSCH configuration in the CSI measurement configuration, it may be considered that the CSI measurement configuration and the PUSCH configuration indicated by the CSI measurement configuration are configured based on a same network device. Therefore, the CSI measurement configuration and the PUSCH configuration indicated by the CSI measurement configuration may be considered as being associated.

Because the CSI measurement configuration includes one or more CSI report configurations, optionally, the condition (f) may be further extended to that the CSI report configuration includes the indication of the associated PUSCH configuration. In this case, a plurality of CSI report configurations in a same CSI measurement configuration may be associated with different PUSCH configurations.

Condition (g)

The condition (g) is similar to the condition (f). The PUSCH configuration may include an indication of an associated CSI measurement configuration. The network device may add, to the PUSCH configuration, a field used to indicate the CSI measurement configuration, to indicate the associated CSI measurement configuration. The indication of the CSI measurement configuration may be, for example, an identifier of the CSI measurement configuration, or other information that may be used to indicate the CSI measurement configuration. When the network device indicates a CSI measurement configuration in the PUSCH configuration, it may be considered that the PUSCH configuration and the CSI measurement configuration indicated by the PUSCH configuration are configured based on a same network device. Therefore, the PUSCH configuration and the CSI measurement configuration indicated by the PUSCH configuration may be considered as being associated.

Because the CSI measurement configuration includes one or more CSI report configurations, optionally, the condition (g) may be further extended to that the PUSCH configuration includes the indication of the associated CSI report configuration. In this case, a plurality of CSI report configurations in a same CSI measurement configuration may be associated with different PUSCH configurations.

Condition (h)

The CSI measurement configuration and the PUSCH configuration may alternatively be associated through a PDCCH configuration.

In this embodiment, the CSI measurement configuration may include an indication of an associated PDCCH configuration, and the PUSCH configuration may also include the indication of the associated PDCCH configuration. The network device separately adds, to the CSI measurement configuration and the PUSCH configuration, a field used to indicate the PDCCH configuration, to indicate the associated PDCCH configuration. The indication of the PDCCH configuration may be, for example, an identifier of the PDCCH configuration, or other information that may be used to indicate the PDCCH configuration. When the network device separately indicates a same PDCCH configuration in the CSI measurement configuration and the PUSCH configuration, it may be considered that the CSI measurement configuration and the PUSCH configuration are associated with the same PDCCH configuration, and the PUSCH configuration is also associated with the CSI measurement configuration.

Further, the condition (h) may be further extended to that the associated PDCCH configuration indicated in the PUSCH configuration and the associated PDCCH configuration indicated in the CSI measurement configuration belong to a same PDCCH configuration group.

That the associated PDCCH configuration indicated in the PUSCH configuration and the associated PDCCH configuration indicated in the PUCCH configuration belong to a same PDCCH configuration group is described in detail above. Herein, only the PUCCH configuration is replaced with the CSI measurement configuration. A method for determining, based on the condition (h), whether the CSI measurement configuration is associated with the PUSCH configuration is similar to the foregoing method for determining, based on the condition (vi), whether the PUCCH configuration is associated with the PUSCH configuration. For brevity, details are not described herein again.

Condition (i)

The condition (i) is the same as the condition (vi) in the foregoing description. For brevity, details are not described herein again.

If the resource of the target PUCCH is determined based on the CSI report configuration, and the PUSCH is a PUSCH with a configured grant, when the PUCCH is associated with the PUSCH, the PUCCH and the PUSCH may meet at least one of the following listed conditions:

(a) A CSI measurement configuration to which the CSI report configuration of the PUCCH belongs (briefly referred to as a CSI measurement configuration of the PUCCH below) and the ConfiguredGrant configuration of the PUSCH belong to a same BWP uplink (UL) dedicated parameter.

(b) The CSI measurement configuration of the PUCCH and the PUSCH configuration of the PUSCH belong to a same BWP uplink dedicated parameter, and an identifier of the CSI measurement configuration is the same as an identifier of the ConfiguredGrant configuration.

(c) An identifier of a BWP downlink dedicated parameter to which the CSI measurement configuration of the PUCCH belongs is the same as an identifier of a BWP uplink dedicated parameter to which the ConfiguredGrant of the PUSCH belongs.

(d) An identifier of a BWP downlink dedicated parameter to which the CSI measurement configuration of the PUCCH belongs is the same as an identifier of a BWP uplink dedicated parameter to which the ConfiguredGrant configuration of the PUSCH belongs, and an identifier of the CSI measurement configuration of the PUCCH is the same as an identifier of the PUSCH configuration of the PUSCH.

(e) An identifier of the CSI measurement configuration of the PUCCH is the same as an identifier of a BWP uplink dedicated parameter to which the ConfiguredGrant configuration of the PUSCH belongs.

(f) The CSI measurement configuration of the PUCCH includes an indication of the ConfiguredGrant configuration of the PUSCH.

(g) The ConfiguredGrant configuration of the PUSCH includes an indication of the CSI measurement configuration of the PUCCH.

(h) A transmit beam used to send the PUCCH and a PUSCH transmit beam used to send the PUSCH belong to a same transmit beam group.

The conditions (a) to (h) listed above may be understood as one or more conditions met by the PUCCH configuration and the ConfiguredGrant configuration that are associated. The following describes in detail the conditions listed above. The foregoing has described in detail each condition about whether the PUCCH configuration of the PUCCH is associated with the PUSCH configuration of the PUSCH, and only the PUSCH configuration is replaced with the ConfiguredGrant configuration herein. Therefore, this is similar to the foregoing description. For brevity, detailed descriptions of the conditions (a) to (h) are omitted herein.

A plurality of conditions that may be used to determine whether the PUCCH is associated with the PUSCH are listed above. However, it should be understood that these conditions should not constitute any limitation on this application. Based on a same concept, a person skilled in the art may transform or replace one or more conditions listed above, and may further extend more possible methods for determining whether the PUCCH is associated with the PUSCH. All of these methods shall fall within the protection scope of this application.

As an example rather than a limitation, based on the conditions listed above, the following content may be further deduced:

a PUCCH and a PUSCH that are in a same serving cell configuration may be associated;

a PUCCH and a PUSCH that are for a same BWP and that are in a same serving cell configuration may be associated; or a PUCCH and a PUSCH that are in a same BWP uplink dedicated parameter for a same BWP and that are in a same serving cell configuration may be associated.

If the terminal device determines, in step 430, that the target PUCCH is associated with the PUSCH, in step 440, the terminal device sends the UCI by using the PUSCH. When the terminal device determines that the target PUCCH is associated with the PUSCH, the terminal device may consider that the first network device and the second network device are a same network device. The terminal device may send the UCI to the second network device by using the PUSCH.

In addition to the methods listed above, this application further provides a method that may be used to determine whether UCI can be transmitted by using a PUSCH. The PUSCH may be a PUSCH scheduled by using a PDCCH. The terminal device may determine, based on an association relationship between a type of the PDCCH used to schedule the PUSCH and a PUCCH configuration or an association relationship between a type of the PDCCH and a CSI report configuration, whether the UCI may be transmitted by using the PUSCH.

The type of the PDCCH may be understood as a type of DCI. Because the DCI may be carried in the PDCCH and sent to the terminal device, the type of the DCI may also be extended to the type of the PDCCH.

Specifically, the association relationship between the PUCCH configuration and the type of the PDCCH may be predefined in a protocol. For example, a PUCCH configuration 0 may be associated with one or more of primary DCI, fast DCI, and first-level DCI, and a PUCCH configuration 1 may be associated with one or more of secondary DCI, slow DCI, and second-level DCI.

When it is predefined in the protocol that the PUCCH configuration 0 may be associated with the primary DCI, the fast DCI, and the first-level DCI, and the PUCCH configuration 1 may be associated with the secondary DCI, the slow DCI, and the second-level DCI, if resources of a PUCCH determined based on the PUCCH configuration 0 and a PUSCH scheduled based on the primary DCI, the fast DCI, or the first-level DCI conflict, UCI that should have been transmitted by using the PUCCH may be transmitted by using the PUSCH; if resources of a PUCCH determined based on the PUCCH configuration 1 and a PUSCH scheduled based on the secondary DCI, the slow DCI, or the second-level DCI conflict, UCI that should have been transmitted by using the PUCCH may be transmitted by using the PUSCH.

The association relationship between the CSI report configuration and the type of the PDCCH may also be predefined in a protocol. For example, a CSI report configuration 0 may be associated with one or more of primary DCI, fast DCI, and first-level DCI, and a CSI report configuration 1 may be associated with one or more of secondary DCI, slow DCI, and second-level DCI.

When it is predefined in the protocol that the CSI report configuration 0 may be associated with the primary DCI, the fast DCI, and the first-level DCI, and the CSI report configuration 1 may be associated with the secondary DCI, the slow DCI, and the second-level DCI, if resources of a PUCCH determined based on the CSI report configuration 0 and a PUSCH scheduled based on the primary DCI, the fast DCI, or the first-level DCI conflict, UCI that should have been transmitted by using the PUCCH may be transmitted by using the PUSCH; if resources of a PUCCH determined based on the CSI report configuration 1 and a PUSCH scheduled based on the secondary DCI, the slow DCI, or the second-level DCI conflict, UCI that should have been transmitted by using the PUCCH may be transmitted by using the PUSCH.

An association relationship between a CSI measurement configuration and the type of the PDCCH may also be predefined in a protocol. For example, a CSI measurement configuration 0 may be associated with one or more of primary DCI, fast DCI, and first-level DCI, and a CSI measurement configuration 1 may be associated with one or more of secondary DCI, slow DCI, and second-level DCI.

When it is predefined in the protocol that the CSI measurement configuration 0 may be associated with the primary DCI, the fast DCI, and the first-level DCI, and the CSI measurement configuration 1 may be associated with the secondary DCI, the slow DCI, and the second-level DCI, if resources of a PUCCH determined based on any CSI report configuration in the CSI measurement configuration 0 and a PUSCH scheduled based on the primary DCI, the fast DCI, or the first-level DCI conflict, UCI that should have been transmitted by using the PUCCH may be transmitted by using the PUSCH; if resources of a PUCCH determined based on any CSI report configuration in the CSI measurement configuration 1 and a PUSCH scheduled based on the secondary DCI, the slow DCI, or the second-level DCI conflict, UCI that should have been transmitted by using the PUCCH may be transmitted by using the PUSCH.

The following describes in detail the type of the DCI.

Based on different content included in DCI, the DCI may be classified into primary DCI and secondary DCI. Information included in the secondary DCI may be a subset of information included in the primary DCI. In other words, the secondary DCI includes only some indicator fields included in the primary DCI, that is, the primary DCI includes more indication information than the secondary DCI. Alternatively, the primary DCI and the secondary DCI may include different information. For example, the master DCI may be DCI including one or more specific parameters. The specific parameter may include, for example, at least one of the following: a carrier indicator, a bandwidth part indicator, a rate matching indicator, or a zero power channel state information reference signal trigger (ZP CSI-RS trigger). Correspondingly, the secondary DCI may be DCI that does not include any one of the foregoing specific parameters. The secondary DCI may be DCI including at least one of the following: resource allocation, a modulation and coding scheme (MCS), a redundancy version (RV), a new data indicator (NDI), and a HARQ process identifier (ID). When DCI blindly detected by the terminal device includes primary DCI and secondary DCI, it may be considered that a PDCCH configuration on which a PDCCH carrying the primary DCI is based is a PDCCH configuration 0, and a PDCCH configuration on which a PDCCH carrying the secondary DCI is based is a PDCCH configuration 1.

In addition, based on different content included in the DCI, the DCI may be further classified into first-level DCI and second-level DCI. The first-level DCI may indicate whether the second-level DCI exists, and may further indicate a time domain position and/or a frequency domain position of the second-level DCI. When DCI blindly detected by the terminal device includes first-level DCI and second-level DCI, it may be considered that a PDCCH configuration on which a PDCCH carrying the first-level DCI is based is a PDCCH configuration 0, and a PDCCH configuration on which a PDCCH carrying the second-level DCI is based is a PDCCH configuration 1.

Based on different occurrence frequencies of DCI, the DCI may be classified into fast DCI and slow DCI. An occurrence frequency of the fast DCI is higher than an occurrence frequency of the slow DCI. For example, the fast DCI may appear once in each slot, and the slow DCI may appear once in a plurality of slots. When DCI blindly detected by the terminal device includes fast DCI and slow DCI, it may be considered that a PDCCH configuration on which a PDCCH carrying the fast DCI is based is a PDCCH configuration 0, and a PDCCH configuration on which a PDCCH carrying the slow DCI is based is a PDCCH configuration 1.

Based on different DCI formats, the DCI may be further classified into DCI in different formats, for example, DCI format 1_0 and DCI format 1_1. When DCI blindly detected by the terminal device includes DCI format 1_0 and DCI format 1_1, it may be considered that a PDCCH configuration on which a PDCCH carrying the DCI format 1_0 is based is a PDCCH configuration 0, and a PDCCH configuration on which a PDCCH carrying the DCI format 1_1 is based is a PDCCH configuration 1.

Different PDCCH configurations may also be distinguished based on different configurations of a same DCI format. For example, one piece of DCI includes only a field (which may specifically include, for example, an MCS, an NDI, and an RV) of configuration information of one transport block (TB), and another piece of DCI includes a field of configuration information of two TBs. When the DCI blindly detected by the terminal device includes DCI with different configurations of a same DCI format, it may be considered that PDCCH configurations on which PDCCH configurations carrying the DCI with the different configurations are different. For example, DCI including only one TB may correspond to a PDCCH configuration 1, and DCI including two TBs may correspond to a PDCCH configuration 0.

It should be understood that the foregoing listed examples of association relationships between different types of DCI and different PUCCH configurations and association relationships between different types of DCI and different CSI report configurations or CSI measurement configurations are merely for ease of understanding, and should not constitute any limitation on this application.

A specific process of sending the UCI by the terminal device by using the PUSCH may be the same as that in a current technology. For brevity, a detailed description of the specific process thereof is omitted herein.

The terminal device may further send other information in addition to the UCI by using the PUSCH, for example, uplink data. Optionally, step 440 includes: The terminal device sends the UCI and the uplink data by using the PUSCH.

If the terminal device determines, in step 430, that the target PUCCH is not associated with the PUSCH, the terminal device does not send the UCI by using the PUSCH, for example, waits to send the UCI on a PUCCH scheduled next time, or does not send the UCI. This is not limited in this application.

That the terminal device does not send the UCI by using the PUSCH does not mean that the terminal device does not transmit other information by using the PUSCH. For example, the terminal device may still send the uplink data by using the PUSCH. Optionally, the terminal device sends the uplink data by using the PUSCH. On the other hand, the network device may know in advance whether the target PUCCH is to be sent to the network device, or may know in advance whether the PUSCH is to be scheduled by the network device. In other words, the network device may know in advance that the target PUCCH is associated with the PUSCH. In other words, the first network device and the second network device are a same network device.

Optionally, before the resources of the PUCCH and the PUSCH arrive, or before step 440, the method 400 further includes: Step 450. The second network device determines whether the resources of the target PUCCH and the PUSCH overlap. If the resources overlap, the second network device may determine that the terminal device may send the UCI by using the PUSCH. Corresponding to step 440, the second network device may receive the UCI on the PUSCH. Optionally, the network device may further receive the uplink data on the PUSCH. If the resources do not overlap, the second network device may determine that the terminal device may not send the UCI by using the PUSCH. Optionally, the second network device receives the uplink data on the PUSCH.

On the contrary, when the target PUCCH is not associated with the PUSCH, the first network device and the second network device are different network devices.

Because the first network device does not schedule the PUSCH, the first network device may not know that the terminal device does not send the UCI because the resources of the target PUCCH and the PUSCH overlap, and may attempt to receive the UCI on the PUCCH, but may fail to receive the UCI. Therefore, the first network device may retransmit a PDSCH scheduled last time, or continue to wait for UCI.

Because the second network device does not know existence of the target PUCCH, and does not know that the resources of the target PUCCH and the PUSCH overlap, the second network device still receives the uplink data on the PUSCH. In this embodiment, because the terminal device may determine that the PUCCH is not associated with the PUSCH, the terminal device may still receive the uplink data on the PUSCH.

Based on the foregoing technical solutions, when the resources of the PUCCH and the PUSCH overlap, the terminal device may determine, depending on whether the PUCCH is associated with the PUSCH, whether the PUCCH and the PUSCH are sent to a same network device. In this way, UCI for the network device may be transmitted by using the PUSCH, and UCI for another network device is prevented from being transmitted by using the PUSCH. Therefore, the network device may receive the UCI on the PUSCH, to determine whether a PDSCH and/or CSI need/needs to be retransmitted.

On the contrary, if the terminal device cannot determine whether the PUCCH is associated with the PUSCH, the terminal device cannot determine whether the PUCCH and the PUSCH are sent to a same network device (for example, the second network device described above). Therefore, UCI that should be sent to another network device (for example, the first network device described above or another network device other than the second network device) may be transmitted on the PUSCH. As a result, when receiving the PUSCH, the second network device cannot accurately obtain, through parsing, the uplink data transmitted on the PUSCH.

Therefore, according to the UCI sending and receiving method provided in this embodiment of this application, the network device can receive the UCI on the PUSCH, so that the network device can make a proper decision based on the received UCI, to avoid a resource waste caused by unnecessary retransmission, thereby improving data transmission performance and user experience.

The methods provided in the embodiments of this application are described above in detail with reference to FIG. 2 to FIG. 4. The following describes in detail a communications apparatus in the embodiments of this application with reference to FIG. 5 to FIG. 7.

Figure 5:
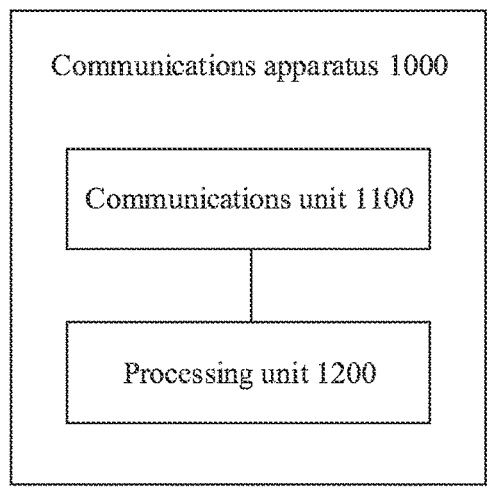
FIG. 5 is a schematic block diagram of a communications apparatus according to an embodiment of this application.

FIG. 5 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiments, for example, may be the terminal device, or a chip disposed in the terminal device.

Specifically, the communications apparatus 1000 may correspond to the terminal device in the method 200 to the method 400 according to the embodiments of this application. The communications apparatus 1000 may include units configured to perform the method performed by the terminal device in the method 200 in FIG. 2, the method 300 in FIG. 3, or the method 400 in FIG. 4. In addition, the units in the communications apparatus 1000 and the foregoing other operations and/or functions are separately intended to implement corresponding procedures of the method 200 in FIG. 2, the method 300 in FIG. 3, or the method 400 in FIG. 4.

When the communications apparatus 1000 is configured to perform the method 200 in FIG. 2, the communications unit 1100 may be configured to perform step 220 in the method 200, and the processing unit 1200 may be configured to perform step 230 in the method 200.

When the communications apparatus 1000 is configured to perform the method 300 in FIG. 3, the communications unit 1100 may be configured to perform step 320 in the method 300, and the processing unit 1200 may be configured to perform step 330 in the method 300.

When the communications apparatus 1000 is configured to perform the method 400 in FIG. 4, the communications unit 1100 may be configured to perform step 420 and step 440 in the method 400, and the processing unit 1200 may be configured to perform step 410 and step 430 in the method 400.

It should be understood that a specific process in which each unit performs the foregoing corresponding steps is described in detail in the foregoing method embodiments. For brevity, details are not described herein again.

Figure 6:
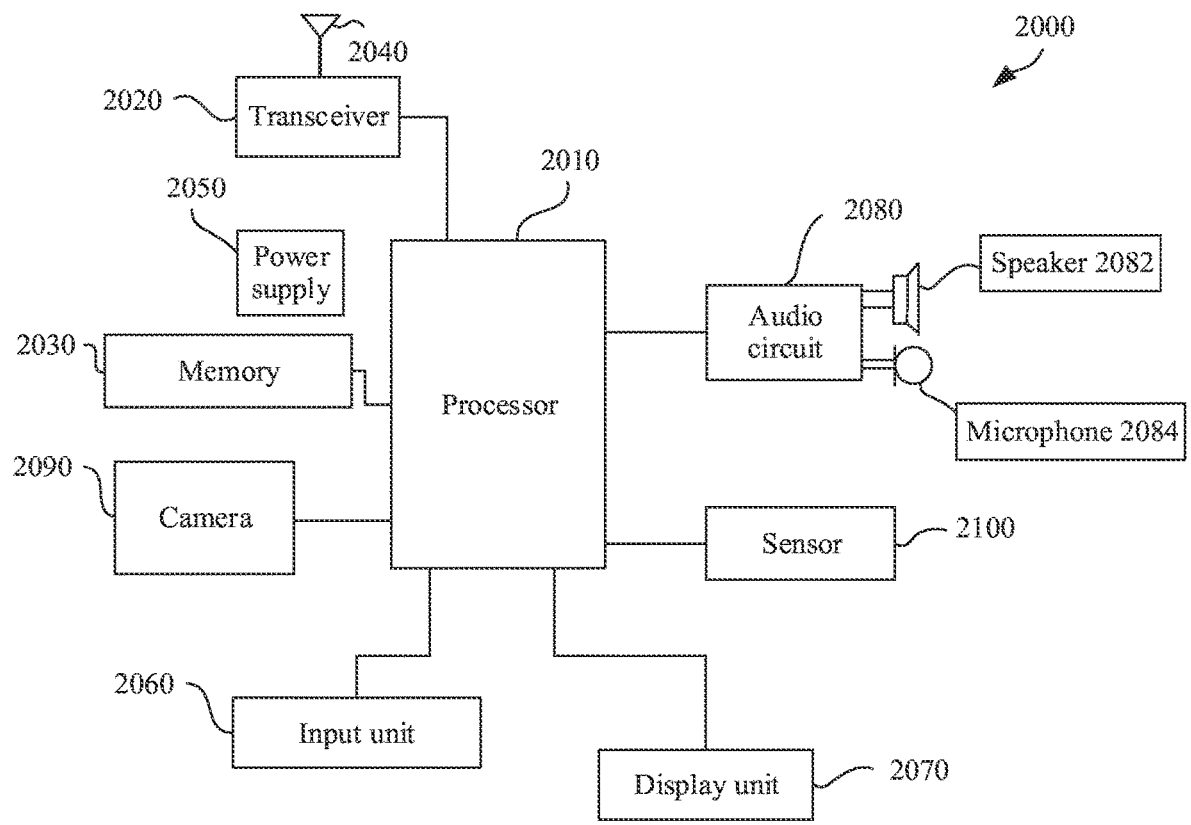
FIG. 6 is a schematic structural diagram of a terminal device according to an embodiment of this application.

It should be further understood that when the communications apparatus 1000 is a terminal device, the communications unit 1100 in the communications apparatus 1000 may correspond to a transceiver 2020 in a terminal device 2000 shown in FIG. 6, and the processing unit 1200 in the communications apparatus 1000 may correspond to a processor 2010 in the terminal device 2000 shown in FIG. 6.

It should be further understood that when the communications apparatus 1000 is a chip disposed in a terminal device, the communications unit 1100 in the communications apparatus 1000 may be an input/output interface.

In another possible design, the communications apparatus 1000 may correspond to the network device in the foregoing method embodiments, for example, may be the network device, or a chip disposed in the network device.

In another possible design, the communications apparatus 1000 may correspond to the network device in the foregoing method embodiments, for example, may be the network device, or a chip disposed in the network device.

Specifically, the communications apparatus 1000 may correspond to the network device in the method 200 to the method 400 according to the embodiments of this application. The communications apparatus 1000 may include units configured to perform the method performed by the network device in the method 200 in FIG. 2, the method 300 in FIG. 3, or the method 400 in FIG. 4. In addition, the units in the communications apparatus 1000 and the foregoing other operations and/or functions are separately intended to implement corresponding procedures of the method 200 in FIG. 2, the method 300 in FIG. 3, or the method 400 in FIG. 4.

When the communications apparatus 1000 is configured to perform the method 200 in FIG. 2, the communications unit 1100 may be configured to perform step 220 in the method 200, and the processing unit 1200 may be configured to perform step 210 in the method 200.

When the communications apparatus 1000 is configured to perform the method 300 in FIG. 3, the communications unit 1100 may be configured to perform step 320 in the method 300, and the processing unit 1200 may be configured to perform step 310 in the method 300.

When the communications apparatus 1000 is configured to perform the method 400 in FIG. 4, the communications unit 1100 may be configured to perform step 420 and step 440 in the method 400, and the processing unit 1200 may be configured to perform step 450 in the method 400.

Figure 7:
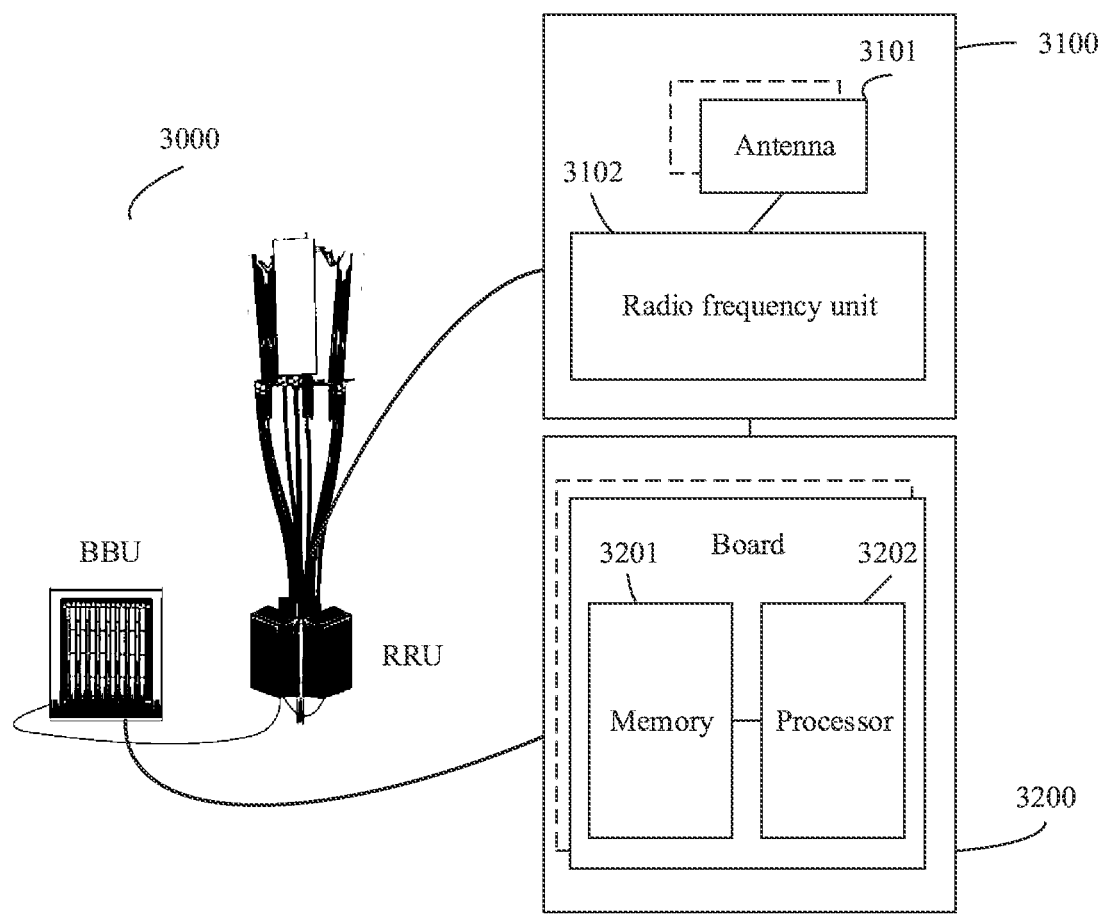
FIG. 7 is a schematic structural diagram of a network device according to an embodiment of this application.

It should be further understood that when the communications apparatus 1000 is a network device, the communications unit in the communications apparatus 1000 may correspond to a transceiver 3200 in a network device 3000 shown in FIG. 7, and the processing unit 1200 in the communications apparatus 1000 may correspond to a processor 3100 in the network device 3000 shown in FIG. 7.

It should be further understood that when the communications apparatus 1000 is a chip configured in a network device, the communications unit 1100 in the communications apparatus 1000 may be an input/output interface.

FIG. 6 is a schematic structural diagram of the terminal device 2000 according to an embodiment of this application. The terminal device 2000 may be applied to the system shown in FIG. 1, and performs functions of the terminal device in the foregoing method embodiments.

As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 5.

The transceiver 2020 may correspond to the communications unit in FIG. 5, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 6 can implement the processes of the terminal device in the method embodiments shown in FIG. 2 to FIG. 4. The operations and/or the functions of the modules in the terminal device 2000 are intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050 that is configured to supply power to various components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 7 is a schematic structural diagram of a network device according to an embodiment of this application, for example, may be a schematic structural diagram of a base station. The base station 3000 may be applied to the system shown in FIG. 1, and performs functions of the network device in the foregoing method embodiments.

As shown in the figure, the base station 3000 may include one or more radio frequency units, such as a remote radio unit (RRU) 3100 and one or more baseband units (BBUs) (which may also be referred to as digital units (DUs)) 3200. The RRU 3100 may be referred to as a transceiver unit, and corresponds to the communications unit 1200 in FIG. 5. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receive machine or a receiver circuit), and the sending unit may correspond to a transmitter (or referred to as a transmit machine or a transmitter circuit). The RRU 3100 is mainly configured to: receive and send a radio frequency signal, and perform conversion between a radio frequency signal and a baseband signal. For example, the RRU 3100 is configured to send indication information to a terminal device. The BBU 3200 is mainly configured to: perform baseband processing, control the base station, and so on. The RRU 3100 and the BBU 3200 may be physically disposed together, or may be physically disposed separately, to be specific, the base station is a distributed base station.

The BBU 3200 is a control center of the base station, and may also be referred to as a processing unit. The BBU may correspond to the processing unit 1100 in FIG. 5, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, generate the foregoing indication information.

In an example, the BBU 3200 may include one or more boards, and a plurality of boards may jointly support a radio access network (for example, an LTE network) of a single access standard, or may separately support radio access networks (for example, an LTE network, a 5G network, or another network) of different access standards. The BBU 3200 further includes a memory 3201 and a processor 3202. The memory 3201 is configured to store a necessary instruction and necessary data. The processor 3202 is configured to control the base station to perform a necessary action, for example, is configured to control the base station to perform an operation procedure related to the network device in the foregoing method embodiments. The memory 3201 and the processor 3202 may serve one or more boards. In other words, a memory and a processor may be independently disposed on each board, or a plurality of boards may share a same memory and a same processor. In addition, a necessary circuit may further be disposed on each board.

It should be understood that the base station 3000 shown in FIG. 7 can implement the processes of the network device in the method embodiments in FIG. 2 to FIG. 4. The operations and/or the functions of the modules in the base station 3000 are intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of receiving or sending that is performed by the network device from or to the terminal device and that is described in the foregoing method embodiments. For details, refer to the descriptions in the foregoing method embodiments. Details are not described herein again.

An embodiment of this application further provides a processing apparatus, including a processor and an interface. The processor may be configured to perform the methods described in the method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro-controller (micro controller unit (MCU)), a programmable controller (programmable logic device (PLD)), or another integrated chip.

In an implementation process, the steps in the foregoing methods may be completed by using a hardware integrated logic circuit in the processor or instructions in a form of software. The steps of the methods disclosed with reference to the embodiments of this application may be directly performed and completed by a hardware processor, or may be performed and completed by a combination of hardware and a software module in the processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, any conventional processor, or the like. The steps of the methods disclosed with reference to the embodiments of this application may be directly performed and completed by a hardware decoding processor, or may be performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these types of memories and any memory of another proper type.

According to the methods provided in the embodiments of this application, this application further provides a computer program product. The computer program product includes computer program code. When the computer program code is run on a computer, the computer is enabled to perform the method in any one of the embodiments shown in FIG. 2 to FIG. 4.

According to the method provided in the embodiments of this application, this application further provides a computer-readable medium. The computer-readable medium stores program code. When the program code is run on a computer, the computer is enabled to perform the method in any one of the embodiments shown in FIG. 2 to FIG. 4.

According to the methods provided in the embodiments of this application, this application further provides a system. The system includes the foregoing one or more terminal devices and the foregoing one or more network devices.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments totally correspond to the network device and the terminal device in the method embodiments. A corresponding module or unit performs a corresponding step. For example, a communications unit (a transceiver) performs a receiving step or a sending step in the method embodiments, and a processing unit (a processor) may perform another step other than the sending step and the receiving step. For a function of a specific unit, refer to the corresponding method embodiments. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that illustrative logical blocks (illustrative logical block) and steps (step) described with reference to the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the embodiments, all or some of the embodiments may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
determining, by an apparatus, that resources of a physical uplink shared channel (PUSCH) and a physical uplink control channel (PUCCH) overlap, wherein the PUSCH is scheduled by a physical downlink control channel (PDCCH), and wherein the PUCCH is used to transmit uplink control information (UCI); and
transmitting, by the apparatus, the UCI on the PUSCH based on that the PUCCH is associated with a PDCCH configuration of the PDCCH.

2. The method according to claim 1, wherein the UCI comprises at least one of hybrid automatic repeat request (HARQ) information or channel state information (CSI).

3. The method according to claim 1, wherein a resource of the PUCCH is determined by a PUCCH configuration, and wherein the PUCCH configuration is associated with the PDCCH configuration.

4. The method according to claim 3, wherein the PUCCH configuration comprises an indication of the PDCCH configuration.

5. The method according to claim 3, wherein the PUCCH configuration and the PDCCH configuration are configured for a same bandwidth part (BWP), and wherein an identifier of a BWP uplink dedicated parameter to which the PUCCH configuration belongs is the same as an identifier of a BWP downlink dedicated parameter to which the PDCCH configuration belongs.

6. The method according to claim 1, wherein a resource of the PUCCH is determined by a CSI report configuration, and wherein the CSI report configuration is associated with the PDCCH configuration.

7. The method according to claim 6, wherein the CSI report configuration comprises an indication of the PDCCH configuration.

8. The method according to claim 6, wherein a CSI measurement configuration to which the CSI report configuration belongs comprises an indication of the PDCCH configuration.

9. The method according to claim 6, wherein a CSI measurement configuration to which the CSI report configuration belongs and the PDCCH configuration belong to a same serving cell, and wherein an identifier of the CSI measurement configuration is the same as an identifier of a BWP downlink dedicated parameter to which the PDCCH configuration belongs.

10. The method according to claim 6, wherein a CSI measurement configuration to which the CSI report configuration belongs and the PDCCH configuration belong to a same BWP dedicated parameter in a same serving cell configuration.

11. The method according to claim 1, wherein a resource of the PUCCH is obtained from a plurality of PUCCH resources in a PUCCH configuration, wherein each PUCCH resource is configured by using a set of PUCCH resource configuration parameters, and wherein the set of PUCCH resource configuration parameters comprise an indication of an associated PDCCH configuration.

12. An apparatus, comprising:
at least one processor; and
a non-transitory computer readable storage medium storing programming for execution by the at least one processor, the programming including instructions to:
determine that resources of a physical uplink shared channel (PUSCH) and a physical uplink control channel (PUCCH) overlap, wherein the PUSCH is scheduled by a physical downlink control channel (PDCCH), and wherein the PUCCH is used to transmit uplink control information (UCI); and
transmit the UCI on the PUSCH based on that the PUCCH is associated with a PDCCH configuration of the PDCCH.

13. The apparatus according to claim 12, wherein the UCI comprises at least one of hybrid automatic repeat request (HARQ) information or channel state information (CSI).

14. The apparatus according to claim 12, wherein a resource of the PUCCH is determined by a PUCCH configuration, and wherein the PUCCH configuration is associated with the PDCCH configuration.

15. The apparatus according to claim 14, wherein the PUCCH configuration comprises an indication of the PDCCH configuration.

16. The apparatus according to claim 14, wherein the PUCCH configuration and the PDCCH configuration are configured for a same bandwidth part (BWP), and wherein an identifier of a BWP uplink dedicated parameter to which the PUCCH configuration belongs is the same as an identifier of a BWP downlink dedicated parameter to which the PDCCH configuration belongs.

17. The apparatus according to claim 12, wherein a resource of the PUCCH is determined by a CSI report configuration, and wherein the CSI report configuration is associated with the PDCCH configuration.

18. The apparatus according to claim 17, wherein the CSI report configuration comprises an indication of the PDCCH configuration.

19. The apparatus according to claim 17, wherein a CSI measurement configuration to which the CSI report configuration belongs comprises an indication of the PDCCH configuration.

20. The apparatus according to claim 17, wherein a CSI measurement configuration to which the CSI report configuration belongs and the PDCCH configuration belong to a same serving cell, and wherein an identifier of the CSI measurement configuration is the same as an identifier of a BWP downlink dedicated parameter to which the PDCCH configuration belongs.

21. The method of claim 1, wherein the PUSCH is scheduled by the PDCCH of a plurality of PDCCHs, the method further comprising:
receiving, by the apparatus, a plurality of PUCCH configurations for a plurality of PUCCHs, each PUCCH configuration of the plurality of PUCCH configurations corresponding to a different network device, the plurality of PUCCHs including the PUCCH, wherein the PUCCH being associated with the PDCCH configuration indicates that the PUCCH and the PUSCH are sent to a same network device.

* * * * *